(12) United States Patent
Ha et al.

(10) Patent No.: US 6,654,076 B2
(45) Date of Patent: Nov. 25, 2003

(54) TRANSFLECTIVE LIQUID CRYSTAL DISPLAY DEVICE AND METHOD OF FABRICATING THE SAME

(75) Inventors: Kyoung-Su Ha, Seoul (KR); Woong-Kwon Kim, Gunpo-si (KR); Dong-Guk Kim, Gunpo-si (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/179,394

(22) Filed: Jun. 26, 2002

(65) Prior Publication Data

US 2003/0081159 A1 May 1, 2003

(30) Foreign Application Priority Data

Oct. 29, 2001 (KR) ........................... 2001-66643

(51) Int. Cl.[7] .............................................. G02F 1/368
(52) U.S. Cl. ...................... 349/43; 349/113; 349/110
(58) Field of Search ...................... 349/43, 44, 110, 349/111, 113, 114, 122, 187; 257/59, 72; 438/30

(56) References Cited

U.S. PATENT DOCUMENTS

2002/0093609 A1 * 7/2002 Baek et al. ............... 349/113

* cited by examiner

*Primary Examiner*—Toan Ton
*Assistant Examiner*—Tai Duong
(74) *Attorney, Agent, or Firm*—McKenna Long & Aldridge LLP

(57) ABSTRACT

The invention relates to an array substrate for use in a transflective liquid crystal display device that has a high contrast ratio. The array substrate includes a first light-shielding pattern on a substrate, which is made of the same material as a gate electrode. The array substrate further includes a second light-shielding pattern that is made of the same material as an active layer in the same process step. These first and second light-shielding patterns are disposed in a border portion between the transmissive portion and the reflective portion, where the liquid crystal molecules are misaligned and the light is distorted. The first and second light-shielding pattern prevents the light leakage occurring in the border region between the transmissive portion and the reflective portion, thereby increasing the contrast ratio of the transflective LCD device.

48 Claims, 17 Drawing Sheets

TRANSFLECTIVE LIQUID CRYSTAL DISPLAY DEVICE AND METHOD OF FABRICATING THE SAME

This application claims the benefit of Korean Patent Application No. 2001-66643 filed on Oct. 29, 2001, the entirety of which is hereby incorporated by reference for all purposes as if fully set forth herein.

BACKGROUND OF THE INVENTION

1. Field of the Invention

The present invention relates to a liquid crystal display, and more particularly, to a transflective liquid crystal display and method of fabricating the same. Although the present invention is suitable for a wide scope of applications, it is particularly suitable for a high contrast ratio.

2. Discussion of the Related Art

The cathode-ray tube (CRT) was developed and is mainly used for display systems. However, flat panel displays are beginning to be incorporated into display systems because of their small dimension, low weight and low power consumption. Presently, thin film transistor-liquid crystal displays (TFT-LCD) having a high resolution are being developed.

In general, Liquid Crystal Display (LCD) devices have various advantages in that, for example, they are relatively thin and require low power for operation, when compared to CRT display devices. Therefore, such LCD devices are good candidates to replace CRT display devices and have been a matter of great interest in a variety of technical fields.

Liquid crystal displays are classified into transmission types and reflection types depending on whether an internal or external light source is used. The transmission type has a liquid crystal display panel that does not itself emit light, and has a backlight as a light-illuminating section.

The backlight is disposed at the rear or one side of the panel. The liquid crystal panel controls the amount of the light, which is generated from the backlight and passes through the liquid crystal panel, in order to implement an image display. In other words, the light from the backlight selectively passes through the LCD panel and the LCD displays images according to the arrangement of the liquid crystal molecules. However, the backlight of the transmission type LCD consumes 50% or more of the total power consumed by the LCD device. Providing a backlight therefore increases power consumption.

In order to overcome the above problem, a reflection type LCD has been selected for portable information apparatuses that are often used outdoors or carried with users. Such a reflection type LCD is provided with a reflector formed on one of a pair of substrates. Thus, ambient light is reflected from the surface of the reflector. The reflection type LCD using the reflection of ambient light is disadvantageous in that a visibility of the display is extremely poor when surrounding environment is dark.

To overcome the problems described above, a construction which realizes both a transmissive mode display and a reflective mode display in one liquid crystal display device has been proposed. This is called a transflective liquid crystal display device. The transflective liquid crystal display (LCD) device alternatively acts as a transmissive LCD device and a reflective LCD device. Due to the fact that a transflective LCD device can make use of both internal and external light sources, it can be operated in bright ambient light and has a low power consumption.

The conventional transflective liquid crystal display device adopts a normally white mode in which the transflective device displays a white color when a signal is not applied. However, since the transflective liquid crystal display device is generally designed concentrating on the reflective mode, only about 50% of the light generated from the backlight device can pass through the liquid crystal display panel when the signal is not applied. Accordingly, the transflective LCD device often produces a gray color in operating.

To overcome the gray color problem, the transflective liquid crystal display device has different liquid crystal cell gaps between in the reflective portion and in the transmissive portion. FIG. 1 is a schematic cross-sectional view of a conventional transflective LCD device having a transmissive portion and a reflective portion.

In FIG. 1, the transflective LCD device divided into the transmissive portion A and the reflective portion B, and includes lower and upper substrates 10 and 60. A liquid crystal layer 100 having optical anisotropy is interposed between the lower and upper substrates 10 and 60.

The lower substrate 10 includes a first passivation layer 20 on its surface facing into the upper substrate 60. The first passivation layer 20 is made of an organic material and has a first transmitting hole 22 corresponding to the transmissive portion A. A transparent electrode 30 of transparent conductive material is disposed on the first passivation layer 20. A second passivation layer 40 and a reflective electrode 50 are sequentially formed on the transparent electrode 30. As shown in FIG. 1, the reflective electrode 50 corresponds to the reflective portion B and has a second transmitting hole 52 that exposes the second passivation layer 40 in the transmissive portion A. Although not shown in FIG. 1, a thin film transistor (TFT) is formed on the lower substrate 10 and electrically connected to both the transparent electrode 30 and the reflective electrode 50.

The upper substrate 60 includes a color filter layer 61 on its surface facing into the lower substrate 10. A common electrode 62 is formed on the surface of the color filter layer 61 facing toward the lower substrate 10.

On the exterior surfaces of the lower and upper substrates 10 and 60, lower and upper retardation films 71 and 72 are disposed, respectively. Since the lower and upper retardation films 71 and 72 have a phase difference $\lambda/4$ ($\lambda=550$ nm), they change the polarization state of the incident light. Namely, the lower and upper retardation films 71 and 72 convert the linearly polarized light into the right- or left-handed circularly polarized light, and they also convert the right- or left-handed circularly polarized light into the linearly polarized light of which polarization direction may be 45° or 135°. A lower polarizer 81 is disposed on the rear surface of the lower retardation film 71, and an upper polarizer 82 is disposed on the front surface of the upper retardation film 72. Optical axis of the upper polarizer 82 is perpendicular to that of the lower polarizer 81. A backlight device 90 that emits an artificial light is adjacent to the lower polarizer 81. Light generated from the backlight device 90 is used as a light source in the transmissive mode of the LCD device.

The liquid crystals interposed between the lower and the upper substrates 10 and 60 have a positive dielectric anisotropy such that the liquid crystal molecules are aligned parallel with the applied electric field. An optical retardation ($\Delta n \cdot d$) of the liquid crystal layer 100 depends on refractive-index anisotropy and thickness of the liquid crystal layer 100. Therefore, the liquid crystal layer 100 has different cell gaps between in the transmissive portion A and in the reflective portion B. The first transmitting hole 22 of the first passivation layer 20 allows the liquid crystal layer 100 of the transmissive portion A to be thicker than that of the reflective portion B, and makes the brightness uniform in all over the LCD device. Advisably, the thickness of the liquid crystal layer 100 in the transmissive portion A is twice as large as that in the reflective portion B.

The liquid crystal display shown in FIG. 1 includes the organic passivation layer that has the opening therein to make the different cell gaps. Thus, it is possible for the LCD device to obtain a uniform transmissivity whether it is operating in the transmissive mode or in the reflective mode. The polarization state of the light passing through the LCD panel shown in FIG. 1 is illustrated with reference to FIGS. 2 and 3.

From the point of the optical axis, the X-Y-Z coordinates are defined as illustrated in FIG. 1. The Z-axis is a progressing direction of the light, and the X-Y plane is parallel with the lower and upper substrates 10 and 60. From the observer's viewpoint at the bottom of the liquid crystal display device, the optical axis of the upper polarizer 82 is 135 degrees with respect to the X-axis, and the optical axis of the lower polarizer 71 is 45 degrees with respect to the X-axis. Therefore, when the observer is at the top of the liquid crystal display device, the optical axis of the upper polarizer 82 is 45 degrees with respected to the X-axis. Furthermore, since the second polarizer 72 has a phase difference $\lambda/4$ ($\lambda$=550 nm) and an optical axis along the X-axial direction, incident light having 45 degrees with respect to the X-axis is converted into a left-handed circularly polarized light, a left-handed circularly polarized light is converted into a linearly polarized light of 135 degrees from the X-axis, incident light 135 degrees with respect to the X-axis is converted into a right-handed circularly polarized light, and a right-handed circularly polarized light is converted into a linearly polarized light of 45 degrees along the left-handed direction. However, since the lower retardation film 71 has a phase difference $\lambda/4$ ($\lambda$=550 nm) and an optical axis along the Y-axial direction, incident light having 45 degrees with respect to the X-axis is converted into a right-handed circularly polarized light, a right-handed circularly polarized light is converted into a linearly polarized light of 135 degrees from the X-axis, incident light 135 degrees with respect to the X-axis is converted into a left-handed circularly polarized light, and a left-handed circularly polarized light is converted into a linearly polarized light of 45 degrees along the right-handed direction. The liquid crystal layer 100 disposed in the reflective region B of FIG. 1 has a optical retardation of $\lambda/4$ and makes the polarized light right-handed.

FIGS. 2A and 2B are views illustrating the state of ambient light passing through components of the transflective LCD device of FIG. 1 when it is operating in a reflective mode.

FIG. 2A shows the state of the ambient light in the reflective mode when a signal voltage is not applied, i.e., the TFT (not shown) is turned OFF. The ambient light illuminates the upper linear polarizer 82. Only the portion of the ambient light that is parallel with the optical axis of the upper polarizer 82 passes through the upper polarizer 82 as linearly polarized light (45° from x-axis of reference frame). The linearly polarized light is changed into left-handed circularly polarized light by the upper retardation film 72. The left-handed circularly polarized light passes through the upper substrate 60, through the color filter layer 61 and through the common electrode 62 without any polarization change. The left-handed circularly polarized light then passes through the liquid crystal layer 100 that has optical retardation of $\lambda/4$. The left-handed circularly polarized light is then converted into linearly polarized light of which polarization direction is 45° as it passes through the liquid crystal layer 100. The linearly polarized light is then reflected by the reflective electrode 50. Due to the reflection, the linearly polarized light changes its polarization direction from 45° to 135°. The reflected linearly polarized light is converted back into a left-handed circularly polarized light as it passes through the liquid crystal layer 100. The left-handed circularly polarized light is then converted into a linearly polarized light of which polarization direction is 135° as it passes through the upper retardation film 72. The linearly polarized light is parallel to the optical axis of the upper polarizer 82, and thus passes through the upper linear polarizer 82. Thus, the LCD device produces light having a white color.

FIG. 2B shows the state of the ambient light in the reflective mode when a signal voltage is applied, i.e., the TFT (not shown) is turned ON. In the ON-state, the liquid crystal layer 100 does not affect polarization state of the incident light. Thus, incident light passes through the liquid crystal layer without any change of polarization state.

Accordingly, the ambient light that passes through the upper polarizer 82 as linearly polarized light is converted into left-handed circularly polarized light by the upper retardation film 72. The left-handed circularly polarized light passes through the upper substrate 60, through the color filter layer 61, through the common electrode 62, and through the liquid crystal layer 100. The left-handed circularly polarized light is then reflected by the reflective electrode 50, which causes the left-handed circularly polarized light to become converted into right-handed circularly polarized light with a phase shift of 180° via a mirror effect. The right-handed circularly polarized light then passes through the liquid crystal layer 100, through the common electrode 62, through the color filter layer 61, and through the second substrate 60. The right-handed circularly polarized light is then converted into linearly polarized light of having a polarization direction of 45° as it passes through the upper retardation film 72. The linearly polarized light is perpendicular to the optical axis of the upper polarizer 82, and as such does not pass through the upper linear polarizer 82. Thus, the LCD device results in a black color.

FIGS. 3A and 3B are views illustrating the state of light from a backlight device passing through components of the transflective LCD device of FIG. 1 when it is operating in a transmissive mode.

FIG. 3A shows the state of the light from the backlight device in the transmissive mode when a signal voltage is not applied, i.e., when the TFT (not shown) is turned OFF. At this time, the liquid crystal layer 100 disposed in the transmissive portion A of FIG. 1 has a optical retardation of $\lambda/2$ because the liquid crystal layer in the transmissive portion A is twice as thick as that in the reflective portion B.

The light from the backlight device enters the lower polarizer 81. As mentioned before, transmissive axis of the lower polarizer 81 is arranged perpendicular to that of the upper polarizer 82. Only the portion of the light that is parallel with the transmissive axis of the lower polarizer 81 passes through the lower polarizer 81 as linearly polarized light of which polarization direction is 45°. The resultant linearly polarized light is converted into right-handed circularly polarized light as it passes through the lower retardation film 71. Then, the right-handed circularly polarized light passes through the lower substrate 10 and through the transparent electrode 30 without any phase shift. Next, the right-handed circularly polarized light is converted into left-handed circularly polarized light as it passes through the liquid crystal layer 100, this being due to a optical retardation λ/2 of the liquid crystal layer 100. The left-handed circularly light then passes through the common electrode 62, through the color filter layer 61 and through the upper substrate 60, without any phase shift. As the left-handed circularly polarized light passes through the upper retardation film 72, the left-handed circularly polarized light is converted into linearly polarized light of which polarization direction is 135°. The linearly polarized light is polarized parallel with the optical axis of the upper polarizer 82, and thus passes through the upper linear polarizer 82. As a result, the LCD device produces a gray color.

FIG. 3B shows the polarization state of the light from the backlight device in the transmissive mode when a signal voltage is applied, i.e., the TFT (not shown) is turned ON. The liquid crystal does not affect the incident light, and thus the incident light passes through the liquid crystal layer without any change of polarization state. The light from the backlight device enters the lower polarizer 81. Only the linearly polarized light of the light of which polarization direction is 45° can pass through the lower polarizer 81. The resultant linearly polarized light is converted into right-handed circularly polarized light as it passes through the lower retardation film 71. Then, the right-handed circularly polarized light passes through the lower substrate 10, through the transparent electrode 30, and through the transmitting holes 22 and 52 without any polarization change. When the right-handed circularly polarized light passes through the liquid crystal layer 100, it is not converted and polarized any more because the liquid crystal layer 100 ideally does not have the optical retardation in the ON-state. The right-handed circularly polarized light then passes through the common electrode 62, through color filter layer 61, and through the upper substrate 60. As the right-handed circularly polarized light passes through the upper retardation film 72, it is converted into linearly polarized light of which polarization direction is 45°. This linearly polarized light is polarized perpendicular to the optical axis of the upper polarizer 82, and therefore, does not pass through the upper linear polarizer 82. Thus, the LCD device produces a black color.

As described before, since the conventional LCD device has different cell gaps between in the transmissive portion and in the reflective portion, the uniform brightness can be obtained whether it is operating in the transmissive mode or in the reflective mode. Furthermore, because it ideally displays the black colors when the voltage is applied, the contrast ratio increases. Accordingly, the LCD device has an improved image quality.

However, as shown in FIG. 1, the first transmitting hole 22 of the first passivation layer 20 causes the liquid crystal layer 100 to have different cell gaps, and moreover, the transmitting hole 22 has slanted portions therearound. Therefore, the cell gaps have altered continuously all over the slanted portions. Further, the liquid crystal molecules above the slanted portions are not aligned properly when the voltage is not applied. These cause the change of the optical retardation of the liquid crystal layer in the slanted portion, thereby promoting the light leakage in those slant portions. When the voltage is applied, the electric field is distorted in the slanted portions, thus the liquid crystal molecules are not aligned appropriately. The optical retardation of the liquid crystal layer also changes in the slanted portion when the voltage is applied, and the light leakage additionally occurs.

SUMMARY OF THE INVENTION

Accordingly, the present invention is directed to a transflective liquid crystal display and a method of fabricating the same that substantially obviate one or more of the problems due to limitations and disadvantages of the related art.

An advantage of the present invention is to provide a transflective LCD display and a method of fabricating the same preventing a light leakage.

Another advantage of the present invention is to provide a transflective LCD display and a method of fabricating the same achieving a high contrast ratio.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an array substrate for use in a transflective liquid crystal display includes a substrate including a transmissive portion, a reflective portion and a border region in a pixel region, wherein the border region is between the transmissive portion and the reflective portion; at least a gate line, a gate electrode and a first light-shielding patter on the substrate, wherein the first light-shielding pattern has a first opening corresponding in position to the transmissive portion and is disposed in the border region; a gate insulation layer on the substrate covering the gate line, the gate electrode and the first light-shielding pattern; an active layer on the gate insulation layer over the gate electrode; a second light-shielding pattern on the gate insulation layer, wherein the second light-shielding pattern has a second opening corresponding in position to the transmissive portion and is disposed in the border region; first and second ohmic contact layers on the active layer; at least a data line, a source electrode and a drain electrode, wherein the data line defines the pixel region with the gate line, and wherein the source electrode is disposed on the first ohmic contact layer and the drain electrode is disposed on the second ohmic contact layer; an inorganic insulation layer on the gate insulation layer, the inorganic insulation layer covering the data line, the source and drain electrodes and the second light-shielding pattern; and an organic passivation layer on the inorganic insulation layer; wherein the inorganic insulation layer and the organic passivation layer have a drain contact hole that exposes a portion of the drain electrode; and wherein the inorganic insulation layer and the organic passivation layer have a first transmitting hole that corresponds in position to the transmissive potion.

The above-mentioned array substrate may further include a first inorganic passivation layer on the organic passivation layer; a reflective plate on the first inorganic passivation layer; a second inorganic passivation layer on the first inorganic passivation layer to cover the reflective plate; and a transparent electrode on the second inorganic passivation layer. The reflective plate has a second transmitting hole that corresponds in position to both the transmissive portion and the border region. Also, the reflective plate is disposed in the reflective portion. The first and second inorganic passivation layers have an additional drain contact hole that exposes a portion of the drain electrode. The transparent electrode contacts the drain electrode through the additional drain contact hole. The first and second inorganic passivation layers are formed of an inorganic material selected from a group consisting of silicon nitride and silicon oxide. The reflective plate is made of a metallic material selected from a group consisting of aluminum and aluminum alloy. the transparent electrode is formed of a transparent conductive material selected from a group consisting of indium tin oxide and indium zinc oxide.

Beneficially, the organic passivation layer is formed of an organic material selected from a group consisting of benzocyclobutene and acryl-based resin. The first and second light-shielding patterns extend to the reflective portion. The first transmitting hole exposes the substrate by removing a portion of the gate electrode in the first opening.

The above-mentioned array substrate may further include a transparent electrode on the organic passivation layer, the transparent electrode contacting the drain electrode through the drain contact hole; an inorganic passivation layer on the organic passivation layer to cover the transparent electrode, the inorganic passivation layer having a contact hole that exposes a portion of the transparent electrode over the drain contact hole; and a reflective electrode on the inorganic passivation layer, the reflective electrode contacting the transparent electrode through the contact hole, the reflective electrode having a second transmitting hole that corresponds to both the transmissive portion and the border region. The reflective electrode is disposed in the reflective portion.

The above-mentioned array substrate may further include a reflective plate between the inorganic insulation layer and the organic passivation layer, the reflective plate having a second transmitting hole corresponds to both the transmissive portion and the border region; and a transparent electrode on the organic passivation layer, the transparent electrode contacting the drain electrode through the drain contact hole.

In another aspect of the present invention, a method of forming an array substrate for use in a transflective liquid crystal display (LCD) device includes the steps of providing a substrate that includes a transmissive portion, a reflective portion and a border region in a pixel region, wherein the border region is between the transmissive portion and the reflective portion; simultaneously forming at least a gate line, a gate electrode and a first light-shielding pattern on the substrate, wherein the first light-shielding pattern has a first opening corresponding in position to the transmissive portion and is disposed in the border region; forming a gate insulation layer on the substrate to cover the gate line, the gate electrode and the first light-shielding pattern; simultaneously forming an active layer and a second light-shielding pattern, wherein the active layer is disposed on the gate insulation layer over the gate electrode and the second light-shielding pattern is disposed on the gate insulation layer, and wherein the second light-shielding pattern has a second opening corresponding in position to the transmissive portion and is disposed in the border region; forming first and second ohmic contact layers on the active layer; simultaneously forming at least a data line, a source electrode and a drain electrode, wherein the data line defines the pixel region with the gate line, and wherein the source electrode is disposed on the first ohmic contact layer and the drain electrode is disposed on the second ohmic contact layer; forming an inorganic insulation layer on the gate insulation layer to cover the data line, the source and drain electrodes and the second light-shielding pattern; and forming an organic passivation layer on the inorganic insulation layer; and patterning both the inorganic insulation layer and the organic passivation layer to from a drain contact hole and a first transmitting hole, wherein the drain contact hole exposes a portion of the drain electrode, and wherein the transmitting hole corresponds in position to the transmissive potion.

The above-mentioned method further includes the steps of forming a first inorganic passivation layer on the organic passivation layer; forming a reflective plate on the first inorganic passivation layer; forming a second inorganic passivation layer on the first inorganic passivation layer to cover the reflective plate; and forming a transparent electrode on the second inorganic passivation layer. The reflective plate has a second transmitting hole that corresponds in position to both the transmissive portion and the border region. The reflective plate is disposed in the reflective portion. The method may further include the step of patterning both the first and second inorganic passivation layers to form an additional drain contact hole that exposes a portion of the drain electrode. The transparent electrode contacts the drain electrode through the additional drain contact hole. The first and second inorganic passivation layers are formed of an inorganic material selected from a group consisting of silicon nitride and silicon oxide. Beneficially, the reflective plate is made of a metallic material selected from a group consisting of aluminum and aluminum alloy, and the transparent electrode is formed of a transparent conductive material selected from a group consisting of indium tin oxide and indium zinc oxide.

Beneficially, the organic passivation layer is formed of an organic material selected from a group consisting of benzocyclobutene and acryl-based resin. The first and second light-shielding patterns can extend to the reflective portion. The above method further includes a step of removing a portion of the gate electrode located in the first opening to expose the substrate.

The above-mentioned method may further include the steps of forming a transparent electrode on the organic passivation layer, the transparent electrode contacting the drain electrode through the drain contact hole; forming an inorganic passivation layer on the organic passivation layer to cover the transparent electrode, the inorganic passivation layer having a contact hole that exposes a portion of the transparent electrode over the drain contact hole; and forming a reflective electrode on the inorganic passivation layer, the reflective electrode contacting the transparent electrode through the contact hole, the reflective electrode having a second transmitting hole that corresponds to both the transmissive portion and the border region. The reflective electrode is disposed in the reflective portion.

The above mentioned method may further include the steps of forming a reflective plate between the inorganic insulation layer and the organic passivation layer, the reflective plate having a second transmitting hole corresponding to both the transmissive portion and the border region; and forming a transparent electrode on the organic passivation layer, the transparent electrode contacting the drain electrode through the drain contact hole.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, example of which is illustrated in the accompanying drawings. Wherever possible, the same reference numbers will be used throughout the drawings to refer to the same or like parts.

Figure 1:
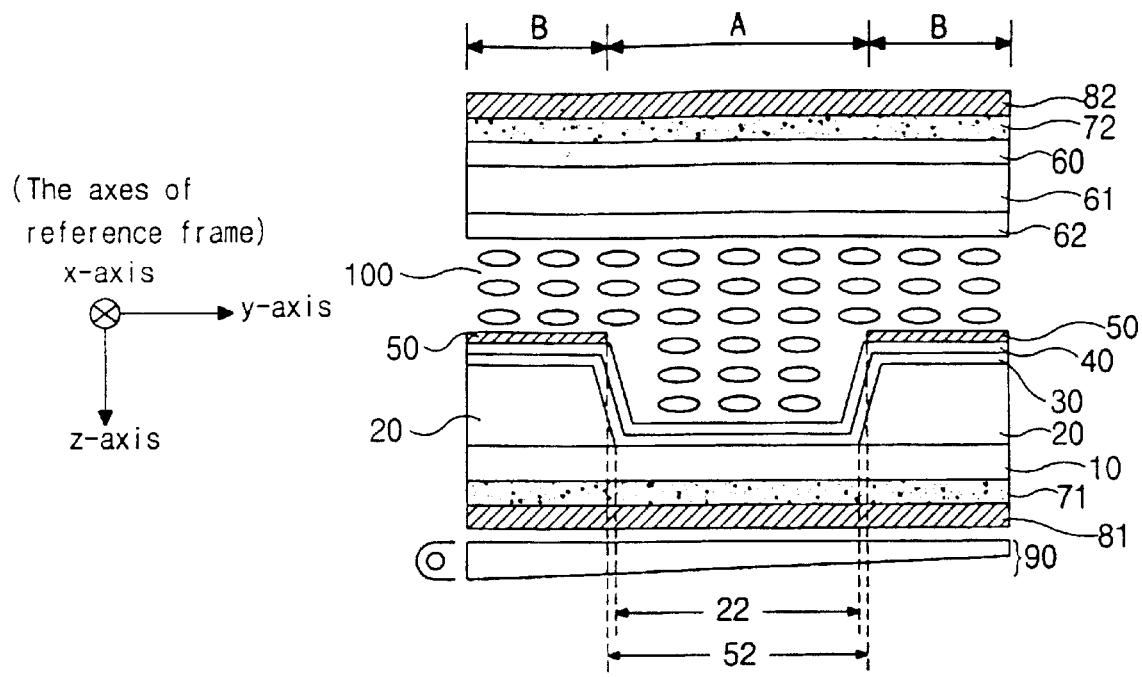
FIG. 1 is a schematic cross-sectional view of a conventional transflective LCD device having a transmissive portion and a reflective portion.
Figure 2A:
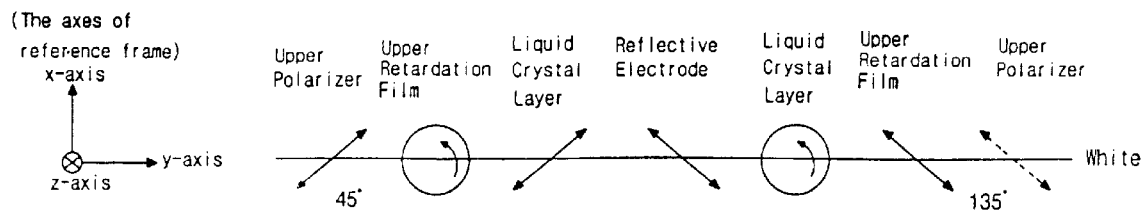
FIGS. 2A and 2B are views illustrating the state of ambient light passing through components of the transflective LCD device of FIG. 1 when it is operating in a reflective mode.
Figure 2B:
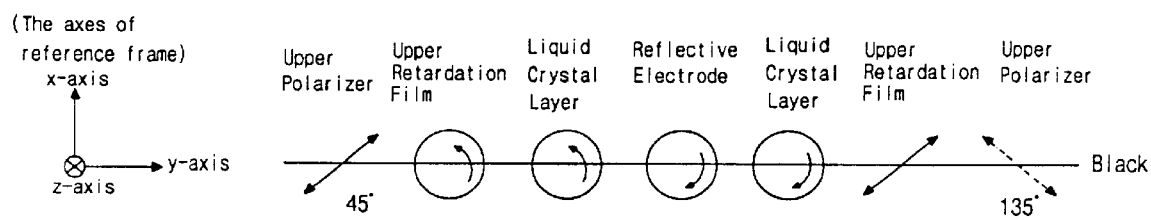
Figure 3A:
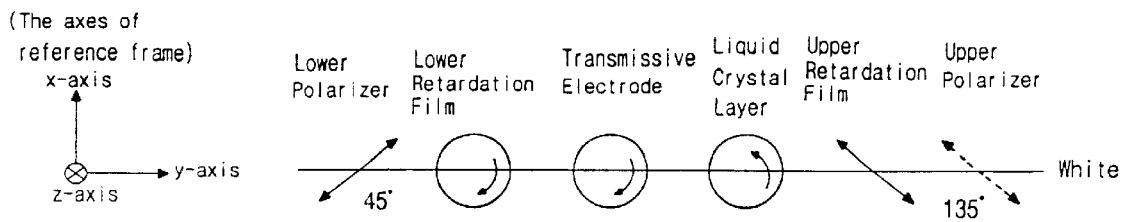
FIGS. 3A and 3B are views illustrating the state of light from a backlight device passing through components of the transflective LCD device of FIG. 1 when it is operating in a transmissive mode.
Figure 3B:
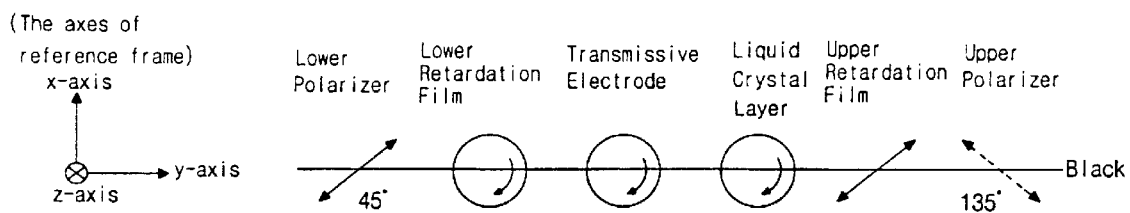
Figure 4:
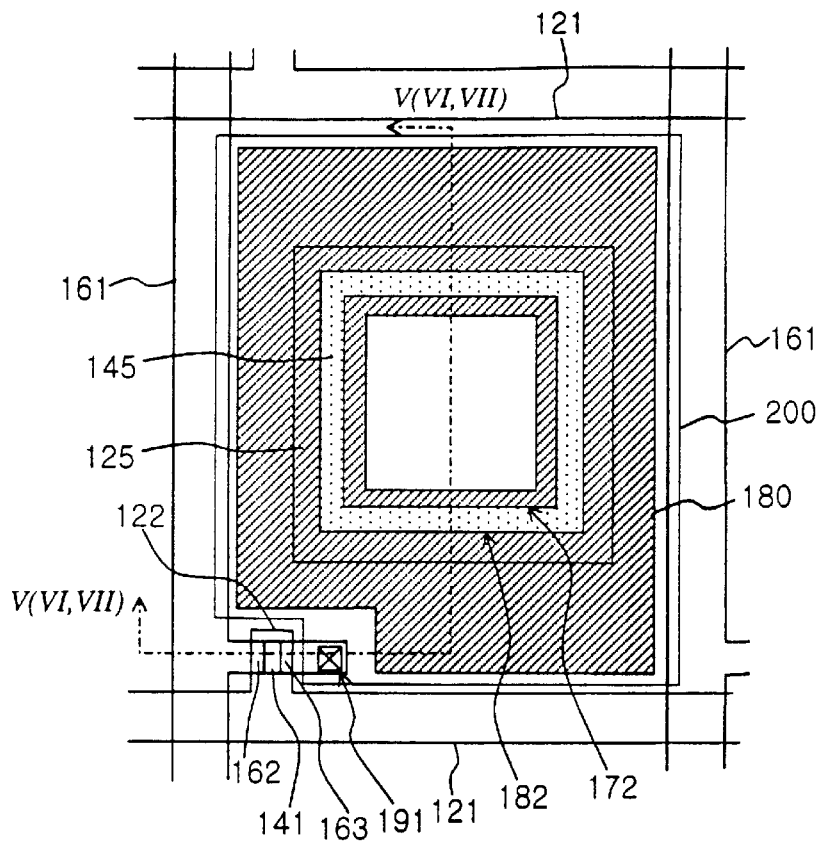
FIG. 4 is a typical schematic plan view of one pixel of an array substrate of a transflective liquid crystal display device according to the present invention.
Figure 5:
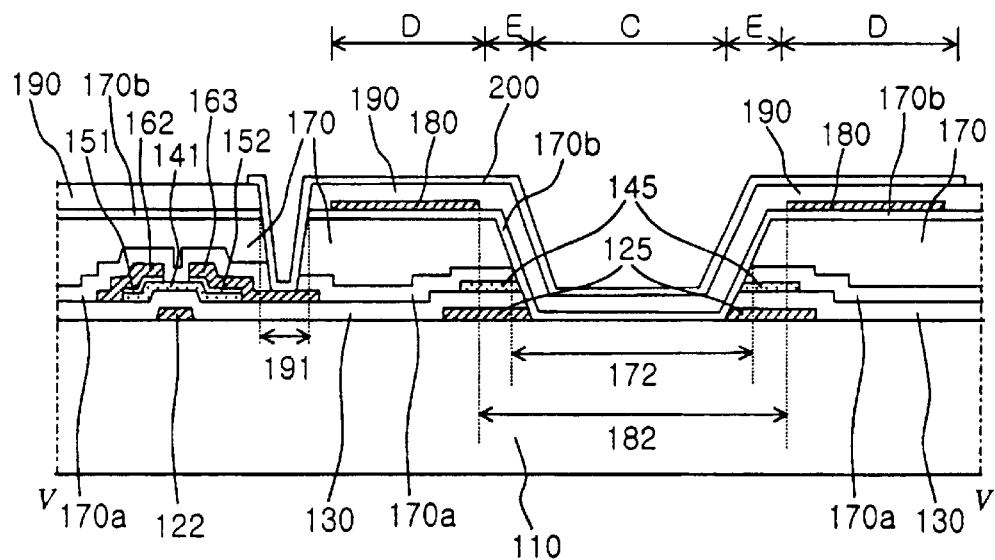
FIG. 5 shows a cross-sectional view according to a first embodiment of the present invention taken along line V—V of FIG. 4.

FIG. 4 is a typical schematic plan view of one pixel of an array substrate of a transflective liquid crystal display device according to the present invention, and FIG. 5 shows a cross-sectional view taken along line V—V of FIG. 4 and illustrates an array substrate according to a first embodiment of the present invention. The array substrate of the present invention includes a transmissive portion C, a reflective portion D and a border region E.

In FIGS. 4 and 5, gate lines 121 are arranged in a transverse direction on a transparent substrate 110, while data line 161 are arranged in a longitudinal direction. A pair of the gate and data lines 121 and 161 define a pixel region. Gate electrodes 122 on the transparent substrate 110 extends from the gate lines 121. A first light-shielding pattern 125 is formed on the transparent substrate 110 of the same material as the gate lines and electrodes 121 and 122. The first light-shielding pattern 125 is disposed in the border region E between the transmissive portion C and the reflective portion D, and has an opening corresponding in position to the transmissive portion C. The first light-shielding pattern 125 not only lies in the border region E but also extends to the reflective portion D. The first light shielding pattern 125 may be of the same material as the gate line 121, gate electrode 122, or data line 161.

A gate insulation layer 130, which is silicon nitride or silicon oxide, is formed on the transparent substrate 110 to cover the gate lines 121, the gate electrodes 122 and the first light-shielding pattern 125. An active layer 141 is formed on the gate insulation layer 130, especially over the gate electrode 122. A second light-shielding pattern 145 is also formed on the gate insulation layer 130 above the first light-shielding pattern 125. Here, the active layer 141 and the second light-shielding pattern 145 are formed of amorphous silicon. Like the first light-shielding pattern 125, the second light-shielding pattern 145 is also disposed in the border region E between the transmissive portion C and the reflective portion D, and has an opening corresponding in position to the transmissive potion C. The second light-shielding pattern 145 not only lies in the border region E, but also extends to the reflective portion D.

Ohmic contact layers 151 and 152 are disposed on the active layer 141 and are made of impurity-included amorphous silicon. A source electrode 162 extending from the data line 161 is formed on the first ohmic contact layer 151, and a drain electrode 163 spaced apart from the source electrode 162 is formed on the second ohmic contact layer 152. A first inorganic insulation layer 170a and a first passivation layer 170 are sequentially formed on the gate insulation layer 130 to cover the second light-shielding pattern 145, the data line 161, and the source and drain electrodes 162 and 163. The first passivation layer 170 is formed of the organic material. Therefore, the first inorganic insulation layer 170a should be interposed between the TFT and the first passivation layer 170, because the organic material deteriorates the electrical characteristics of the TFT when it directly contacts the active layer 141.

The first passivation layer 170 has a first transmitting hole 172 corresponding to the transmissive portion C in the pixel region. As described above, such a transmitting hole 172 provides different cell gaps in the transmissive portion C and in the reflective portion D, thereby allowing the transflective LCD device to display uniform brightness. Substantially, the cell gap of the transmissive portion C is twice as large as that of the reflective portion D. The organic material for the first passivation layer 170 is generally selected from one of benzocyclobutene (BCB) and acryl-based resin. In the structure shown in FIG. 5, the first transmitting hole 172 can penetrate the first inorganic insulation layer 170a and the gate insulation layer 130 to the transparent substrate 110.

A second inorganic insulation layer 170b and a reflective plate 180 are sequentially formed on the first passivation layer 170. As shown in FIG. 5, the reflective plate 180 has a second transmitting hole 182 corresponding to both the reflective portion C and the border region E. The second transmitting hole 182 may be a little bit wider than the first transmitting hole 172. Aluminum or aluminum alloy is employed for the reflective plate 180, for example. The material for the reflective plate 180 should have a superior reflectivity and is formed on the inorganic insulation layer 170b using a sputtering method. If the reflective plate 180 is directly formed on the organic passivation layer 170, the sputtering chamber can be contaminated and thus the manufacturing yields decrease. Therefore, the second inorganic insulation layer 170b should be disposed between the first passivation layer 170 and the reflective plate. 180. A second passivation layer 190 is formed on the second inorganic insulation layer 170b to cover the reflective plate 180. The second passivation layer has a drain contact hole 191 that exposes a portion of the drain electrode 163. The second passivation layer 190 is formed of an inorganic material, such as silicon oxide and silicon nitride. Although not shown in FIG. 5, the second passivation layer 190 may have a third transmitting hole that corresponds in position to the first and second transmitting holes 172 and 182. A transparent electrode 200 is formed on the second passivation layer 190, and contacts the drain electrode 163 through the drain contact hole 191. In the first embodiment of the present invention shown in FIG. 5, although the second passivation layer 190 electrically isolates the transparent electrode 200 from the reflective plate 180, the reflective plate 180 and the transparent electrode 200 can have an electrical connection each other.

Accordingly in the first embodiment, since the first light-shielding pattern 125 is formed using the same material as the gate lines and electrodes in the border region E between the transmissive portion C and the reflective portion D, the light generated from the backlight device can be prevented when the transflective LCD device is operating in the transmissive mode. Furthermore, since the amorphous silicon of the second light-transmitting pattern absorbs the ambient light from the outside, it can prevent the distortion caused by the reflective light in the transmissive mode and in the reflective mode. As a result, the transflective LCD device improves the contrast ratio both in the reflective mode and in the transflective mode according to the first embodiment of the present invention.

FIGS. 6A to 6G show cross sectional views taken along line V—V of FIG. 4 and illustrate the sequential process steps of manufacturing an array substrate according to the first embodiment of the present invention.

Figure 6A:
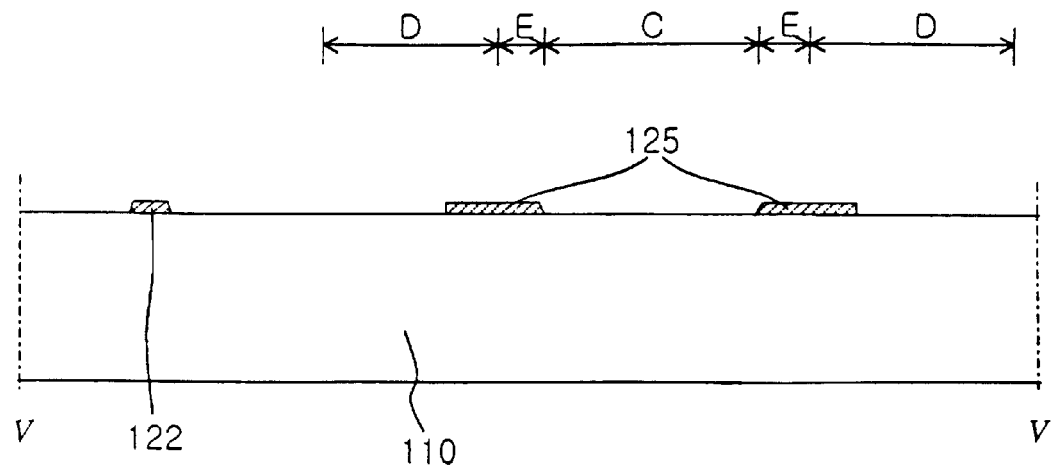
FIGS. 6A to 6G illustrate the process steps of manufacturing an array substrate according to the first embodiment of the present invention.

Referring first to FIG. 6A, a metallic material is deposited on the transparent substrate 110 and then patterned to form the gate line 121 (in FIG. 4) and the gate electrode 122. At this time, the first light-shielding pattern 125 is also formed in a position corresponding to the border region E between the transmissive portion C and the reflective portion D.

Figure 6B:
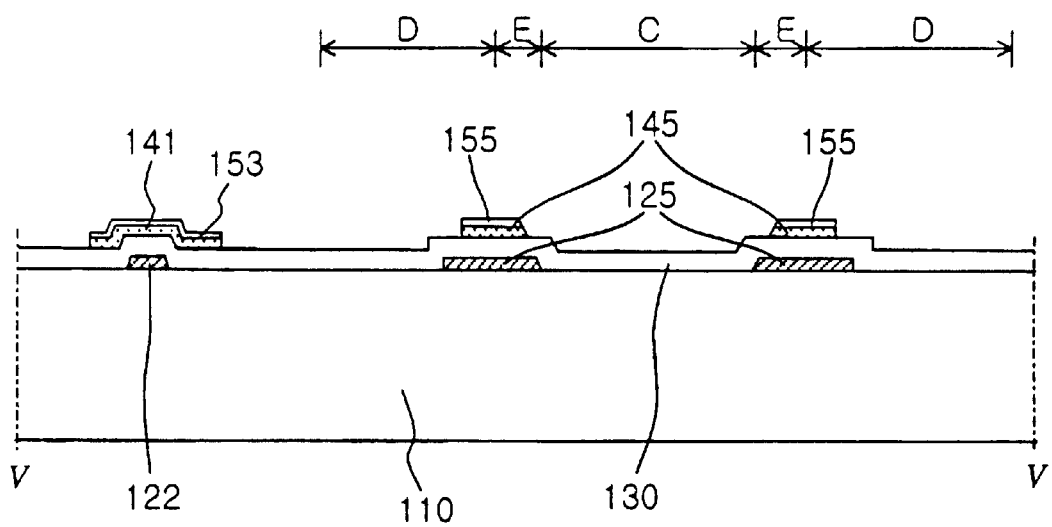

In FIG. 6B, the gate insulation layer 130 is formed on the transparent substrate 110 to cover the gate line 121 (in FIG. 4), the gate electrode 122 and the first light-shielding pattern 125. Thereafter, an amorphous silicon layer and an impurity-included amorphous silicon layer are sequentially formed on the gate insulation layer 130, and then patterned to form the active layer 141 over the gate electrode 122 and the extrinsic semiconductor layer 153 on the active layer 141. At this time, the second light-shielding pattern 145 and a dummy pattern 155 are also formed over the first light-shielding pattern 125.

Figure 6C:
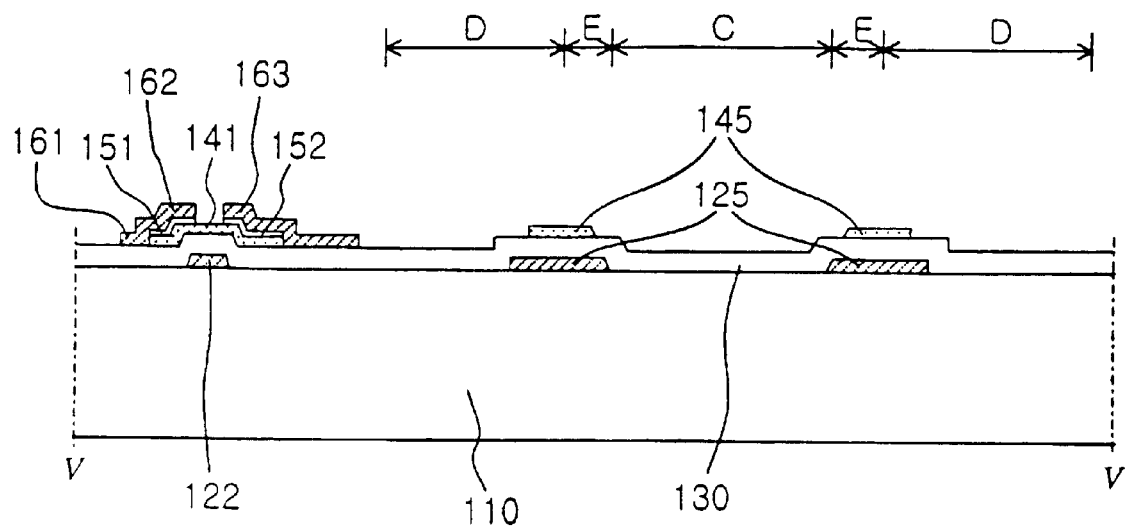

Next in FIG. 6C, a metallic material is deposited on the gate insulation layer 130 to cover the patterned silicon layers, and then patterned to form the data line 161 and the source and drain electrodes 162 and 163. Thereafter, the exposed portion of the extrinsic semiconductor layer 153 is eliminated and the dummy pattern 155 is also simultaneously removed, thereby forming the first and second ohmic contact layers 151 and 152. As a result, the drain electrode 162 is formed on the first ohmic contact layer 151 and the source electrode 163 is formed on the second ohmic contact layer 152.

Figure 6D:
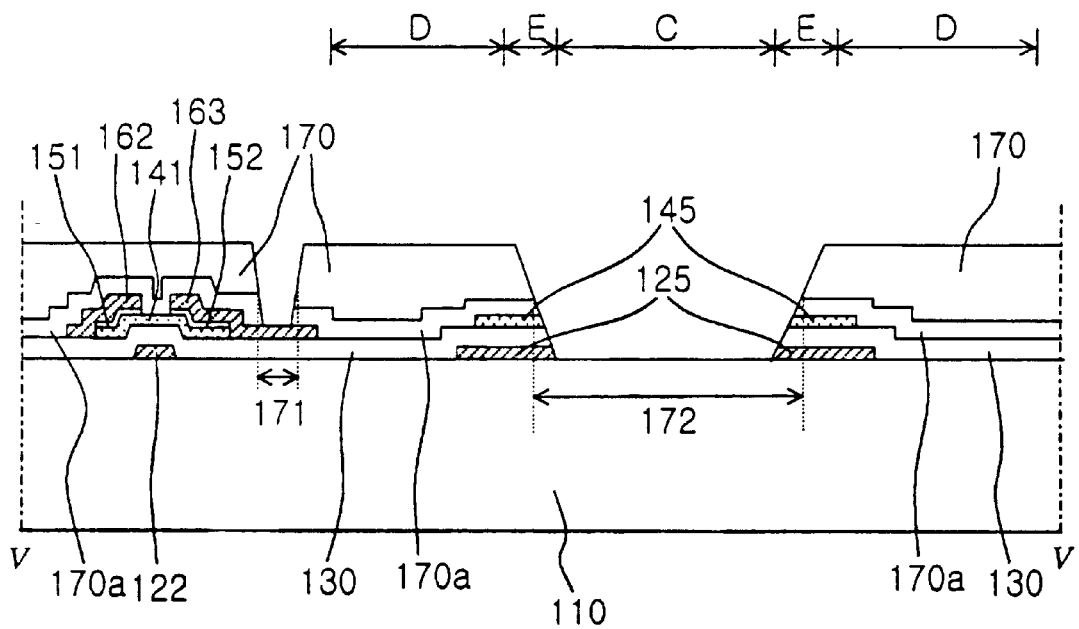

In FIG. 6D, the first inorganic insulation layer 170a is deposited on the gate insulation layer 130 using one of silicon nitride and silicon oxide to cover the second light shielding pattern 145, the data line 161, and the source and drain electrodes 162 and 163. Sequentially, the first passivation layer 170 is formed on the first inorganic insulation layer 170a using one of benzocyclobutene (BCB) and acryl-based resin. Then, the first passivation 170 and the first inorganic insulation layer 170a are patterned to form the first transmitting hole 172 and a first drain contact hole 171. At this time, a portion of the gate insulation layer 130 can be patterned to let the first transmitting hole 172 expose the transparent substrate 110 in the transmissive portion C, as shown in FIG. 6D.

Figure 6E:
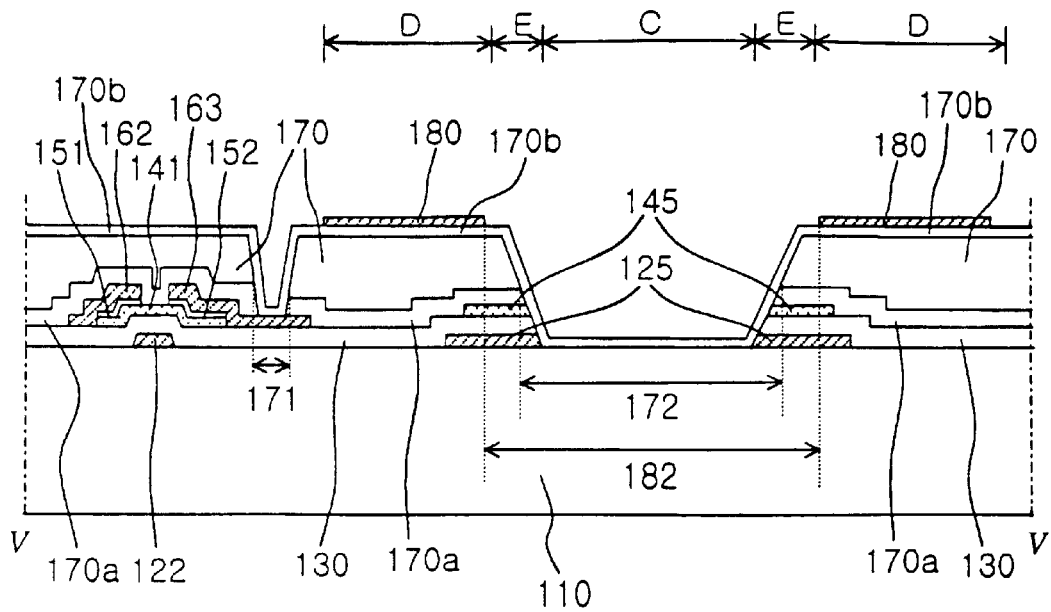

Referring to FIG. 6E, the second inorganic insulation layer 170b is formed on the first passivation layer 170. Thereafter, a metallic material having a superior reflectivity, such as aluminum or aluminum alloy, is deposited on the second inorganic insulation layer 170b, and then patterned to form the reflective plate 180. Here, the reflective plate 180 is disposed in the pixel region defined by the gate and data lines 121 and 161 (in FIG. 4), and has the second transmitting hole 182 over the first transmitting hole 172.

Figure 6F:
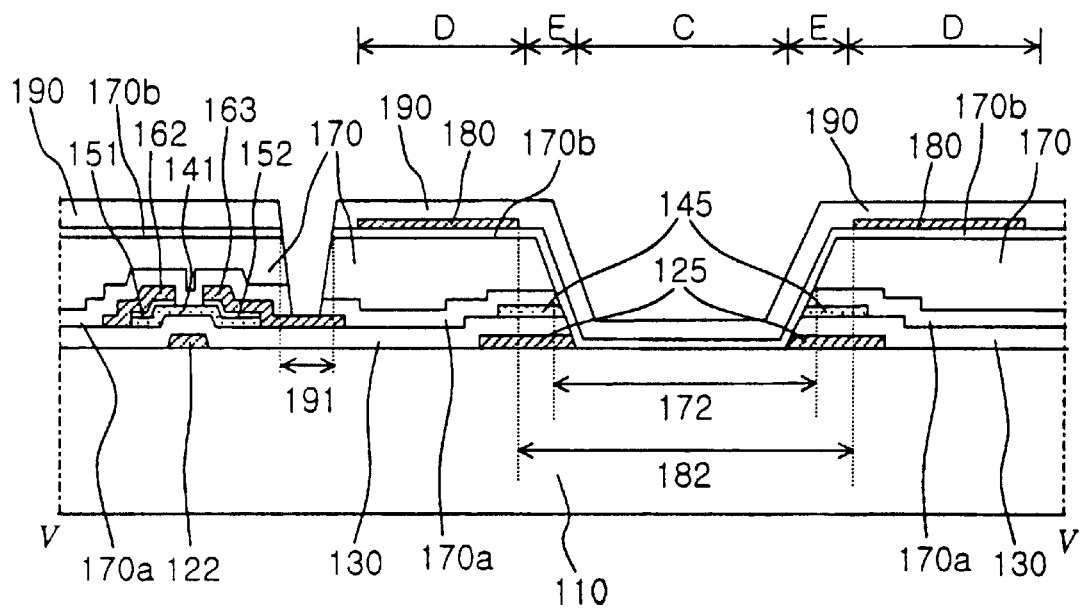

Now in FIG. 6F, the second passivation layer 190 is formed on the second inorganic insulation layer 170b to cover the reflective plate 180 using the inorganic material. Both the second passivation layer 190 and the second inorganic insulation layer 170b are patterned to form a second drain contact hole 191 that exposes a portion of the drain electrode 163. At this time, a third transmitting hole corresponding in position to the first and second transmitting holes 172 and 182 may be formed by removing portions of the second inorganic insulation layer 170b and the second passivation layer 190.

Figure 6G:
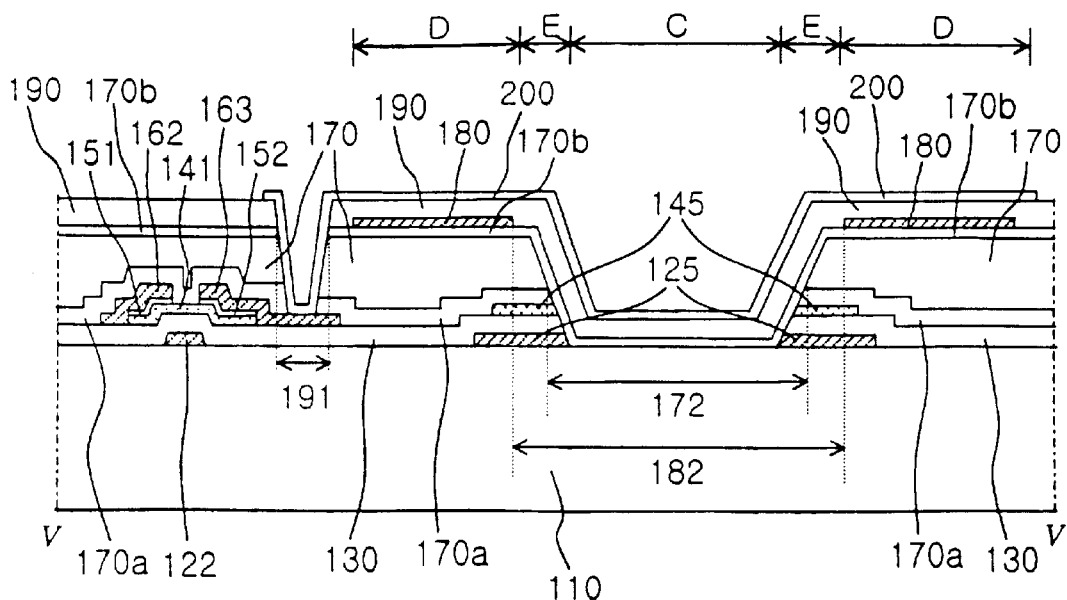

In FIG. 6G, a transparent conductive material is deposited on the second passivation layer 190 and then patterned to form the transparent electrode 200. Through the drain contact hole 191, the transparent electrode 200 contacts the drain electrode 163. Here, the transparent conductive material is indium tin oxide (ITO) or indium zinc oxide (IZO).

Although FIGS. 6A to 6G show the transparent electrode is formed above the reflective plate, it is possible that the reflective plate changes places with the transparent electrode. Additionally, the reflective plate can be connected with the transparent electrode to serve as a pixel electrode.

Figure 7:
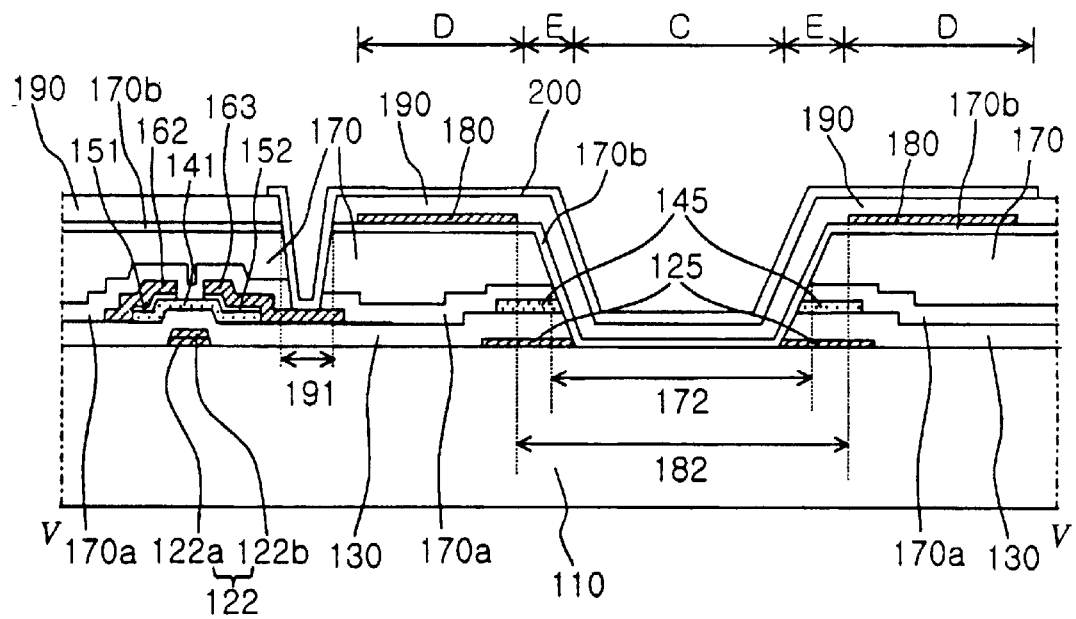
FIG. 7 shows the cross-sectional view of FIG. 5 modified to have a dual layer gate electrode.

As shown in FIG. 7, the structure of FIG. 5 can be modified to include a gate elcterode 122 having a double layer structure. For example, a lower gate electrode portion 122a may be aluminum, while a gate electrode portion 122b may be molybdenum. In such case, the first light-shielding pattern 125 is of the same material as one of the lower gate electrode portion 122a and the upper gate electrode portion 122b.

Figure 8:
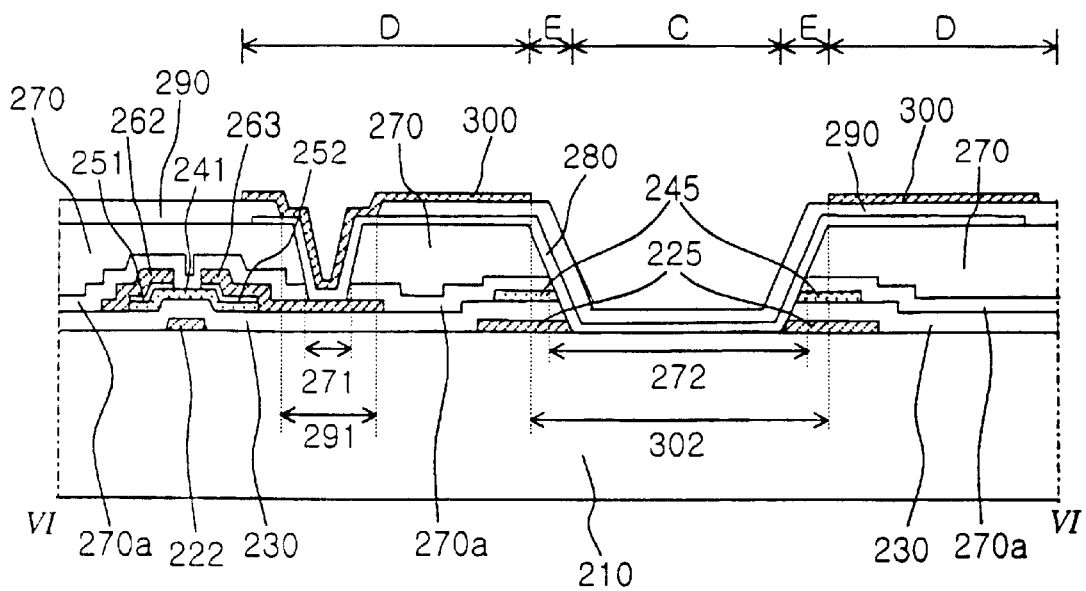
FIG. 8 shows a cross-sectional view according to a second embodiment of the present invention taken along line VI—VI of FIG. 4.

FIG. 8 shows cross-sectional view taken along line VI—VI of FIG. 4 and illustrates an array substrate according to a second embodiment of the present invention. The array substrate shown in FIG. 8 is similar to that shown in FIG. 5, but there are some differences.

In FIG. 8, the array substrate of the present invention is divided into a transmissive portion C, a reflective portion D and a border region E. A gate electrode 222 and a first light-shielding pattern 225 are formed on the transparent substrate 210. The first light-shielding pattern 225 is disposed in the border region E between the transmissive portion C and the reflective portion D and has an opening corresponding in position to the transmissive portion C. The first light-shielding pattern 225 not only lies in the border region E but also extends to the reflective portion D. A gate insulation layer 230 is formed on the transparent substrate 210 to cover the gate electrodes 222 and the first light-shielding pattern 225. The first light shielding pattern 225 may be of the same material as the gate electrode 222, gate line (not shown) or data line (not shown).

An active layer 241 is formed on the gate insulation layer 230, especially over the gate electrode 222. A second light-shielding pattern 245 is also formed on the gate insulation layer 230 above the first light-shielding pattern 225.

Here, the active layer 241 and the second light-shielding pattern 245 are formed of amorphous silicon. Like the first light-shielding pattern 225, the second light-shielding pattern 245 is also disposed in the border region E between the transmissive portion C and the reflective portion D and has an opening corresponding in position to the transmissive potion C. The second light-shielding pattern 245 not only lies in the border region E but also extends to the reflective portion D. Ohmic contact layers 251 and 252 are disposed on the active layer 241 are made of impurity-included amorphous silicon. A source electrode 262 is formed on the first ohmic contact layer 251, while a drain electrode 263 is formed on the second ohmic contact layer 252.

An inorganic insulation layer 270a and a first passivation layer 270 are sequentially formed on the gate insulation layer 230 to cover the second light-shielding pattern 245 and the source and drain electrodes 262 and 263. The first passivation layer 270 is formed of the organic material, such as benzocyclobutene (BCB) or acryl-based resin. Therefore, as described in the first embodiment, the inorganic insulation layer 270a should be interposed between the TFT and the first passivation layer 270 because the organic material deteriorates the electrical characteristics of the TFT when it directly contacts the active layer 241. The first passivation layer 270 has a first transmitting hole 272 corresponding to the transmissive portion C in a pixel region defined by the gate and data lines. Further, the first passivation layer 270 has a first contact hole 271 that exposes a portion of the drain electrode 263. As described hereinbefore, such a transmitting hole 272 provides different cell gaps in the transmissive portion C and in the reflective portion D, thereby allowing the transflective LCD device to display uniform brightness whether the transflective LCD device is operating as the transmissive mode or as the reflective mode. Substantially, the cell gap of the transmissive portion C is twice as large as that of the reflective portion D. In the structure shown in FIG. 8, the first transmitting hole 272 can penetrate the inorganic insulation layer 270a and the gate insulation layer 230 to the transparent substrate 210.

A transparent electrode 280 is formed on the first passivation layer 270, and contacts the drain electrode 263 through the first contact hole 271. The transparent electrode 280 is made of a transparent conductive material, such as indium tin oxide (ITO) or indium zinc oxide (IZO). Since such a transparent conductive material does not contaminate the deposition apparatus when it is deposited on the organic passivation layer 270, an additional inorganic insulation layer is not required between the organic passivation layer 270 and the transparent electrode 280 in the second embodiment, unlike the first embodiment. A second passivation layer 290 is formed on the first passivation layer 270 and on the transparent electrode 280. The second passivation layer 290 is an inorganic material, such as silicon oxide and silicon nitride, and has a second contact hole 291 that exposes a portion of the transparent electrode 280 over the drain electrode 263. A reflective electrode 300 is formed on the second passivation layer 290. As shown in FIG. 8, the reflective electrode 300 has a second transmitting hole 302 corresponding to both the reflective portion C and the border region E, and thus, the reflective electrode 300 corresponds in position to the reflective portion D. The second transmitting hole 302 may be a little bit wider than the first transmitting hole 272. The reflective electrode 300 contacts the transparent electrode 280 through the second contact hole 291.

FIGS. 9A to 9G show cross-sectional views taken along line VI—VI of FIG. 4 and illustrate the sequential process steps of manufacturing an array substrate according to the second embodiment of the present invention.

Figure 9A:
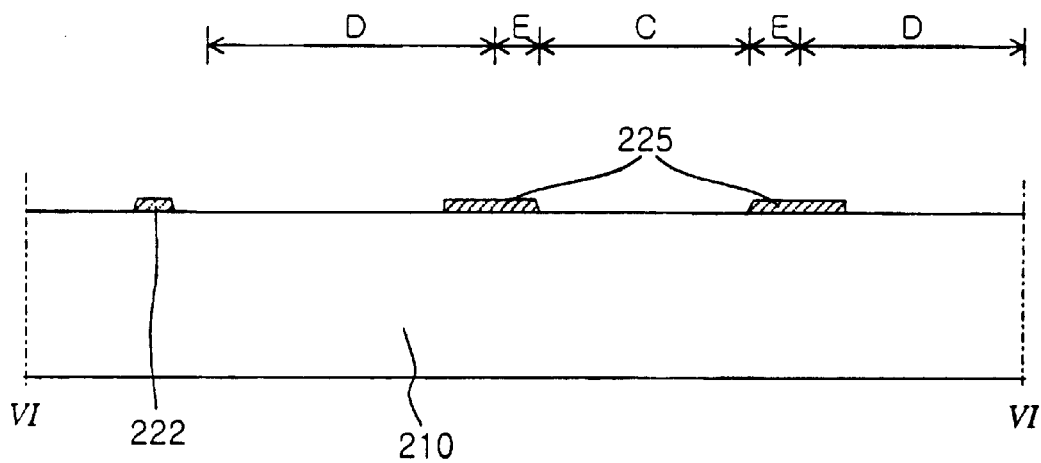
FIGS. 9A to 9G illustrate the process steps of manufacturing an array substrate according to the second embodiment of the present invention.

Referring first to FIG. 9A, a metallic material is deposited on the transparent substrate 210 and then patterned to form the gate electrode 222 and the first light-shielding pattern 225. The first light-shielding pattern 225 is disposed in a position corresponding to the border region E between the transmissive portion C and the reflective portion D.

Figure 9B:
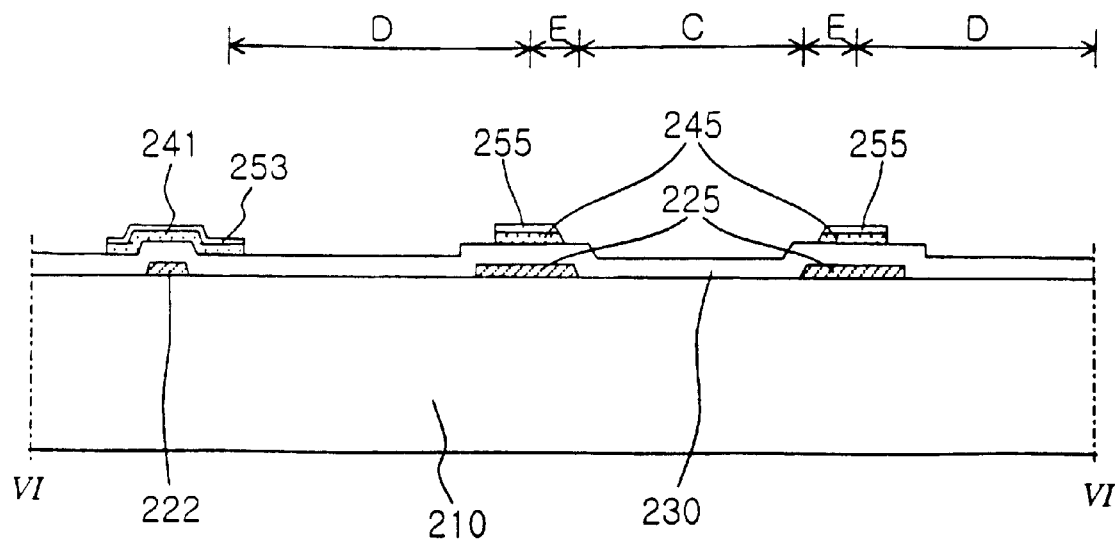

In FIG. 9B, the gate insulation layer 230 is formed on the transparent substrate 210 to cover the gate electrode 222 and the first light-shielding pattern 225. Thereafter, an amorphous silicon layer and an impurity-included amorphous silicon layer are sequentially formed on the gate insulation layer 230, and then patterned to form the active layer 241 over the gate electrode 222 and the extrinsic semiconductor layer 253 on the active layer 241. At this time, the second light-shielding pattern 245 and a dummy pattern 255 are also sequentially formed on the gate insulation layer 230 and over the first light-shielding pattern 225.

Figure 9C:
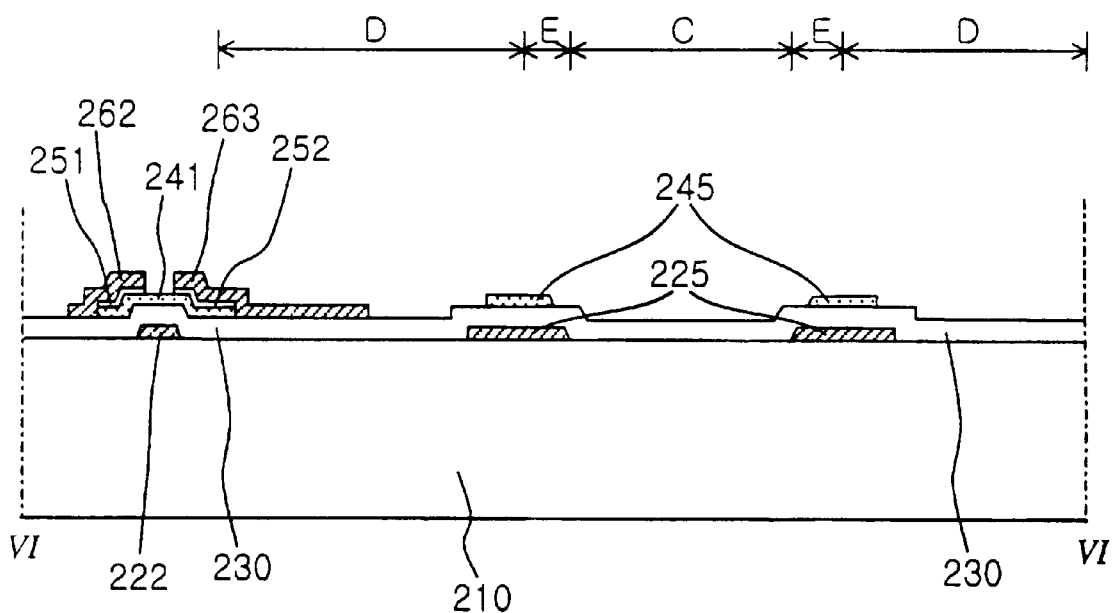

Next in FIG. 9C, a metallic material is deposited on the gate insulation layer 230 to cover the patterned silicon layers, and then patterned to form the source and drain electrodes 262 and 263. Thereafter, the exposed portion of the extrinsic semiconductor layer 253 is eliminated and the dummy pattern 255 is also simultaneously removed, thereby forming the first and second ohmic contact layers 251 and 252. As a result, the drain electrode 262 is formed on the first ohmic contact layer 251 and the source electrode 263 is formed on the second ohmic contact layer 252.

Figure 9D:
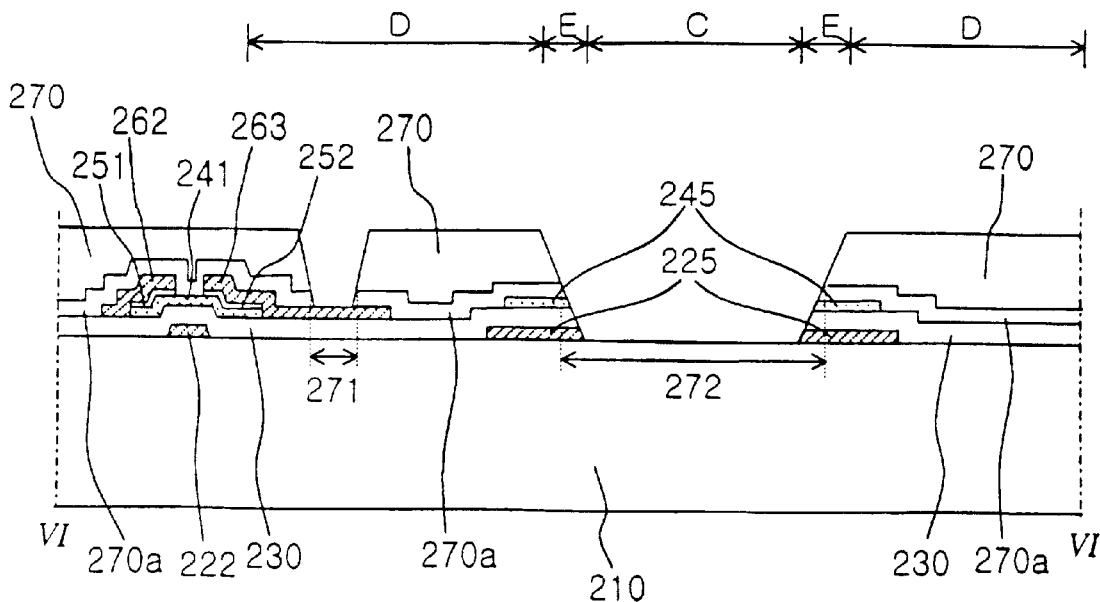

In FIG. 9D, the inorganic insulation layer 270a is deposited on the gate insulation layer 230 using one of silicon nitride and silicon oxide to cover the second light-shielding pattern 245 and the source and drain electrodes 262 and 263. Sequentially, the first passivation layer 270 is formed on the inorganic insulation layer 170a using one of benzocyclobutene (BCB) and acryl-based resin. Then, the inorganic insulation layer 270a and the first passivation layer 270 are patterned to form the first contact hole 271 and the first transmitting hole 272. The contact hole 271 exposes a portion of the drain electrode 263. The first transmitting hole 272 corresponds to the transmissive portion C. When the first transmitting hole 272 is formed, a portion of the gate insulation layer 230 can be removed to let the first transmitting hole 272 expose the transparent substrate 210 in the transmissive portion C, as shown in FIG. 9D.

Figure 9E:
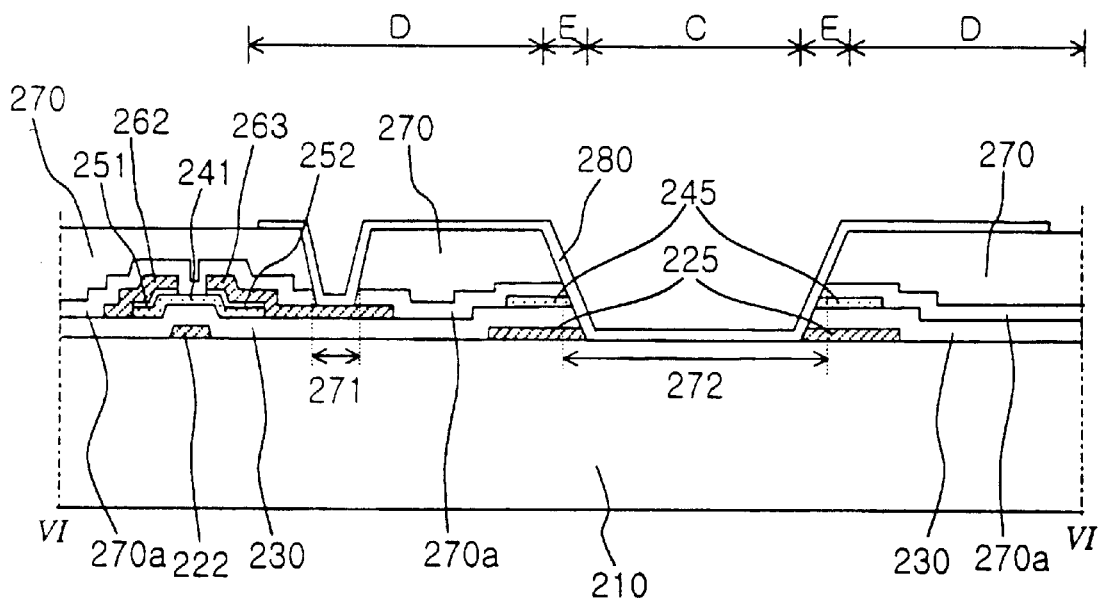

Referring to FIG. 9E, a transparent conductive material is deposited on the first passivation layer 270 and then patterned to form the transparent electrode 280. Through the first contact hole 271, the transparent electrode 280 contacts the drain electrode 263. Here, the transparent conductive material is indium tin oxide (ITO) or indium zinc oxide (IZO).

Figure 9F:
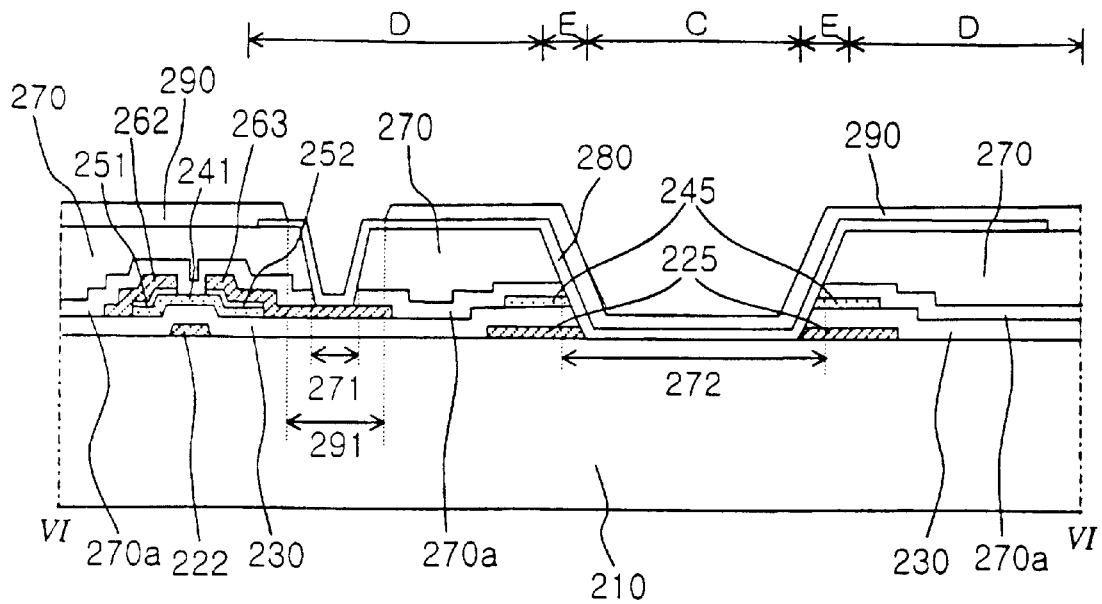

Now in FIG. 9F, the second passivation layer 290 is formed on the first passivation layer 270 to cover the transparent electrode 280 using the inorganic material, such as silicon nitride or silicon oxide. The second passivation layer 290 is patterned to form a second contact hole 291 that exposes a portion of the transparent electrode 280 over the drain electrode 263.

Figure 9G:
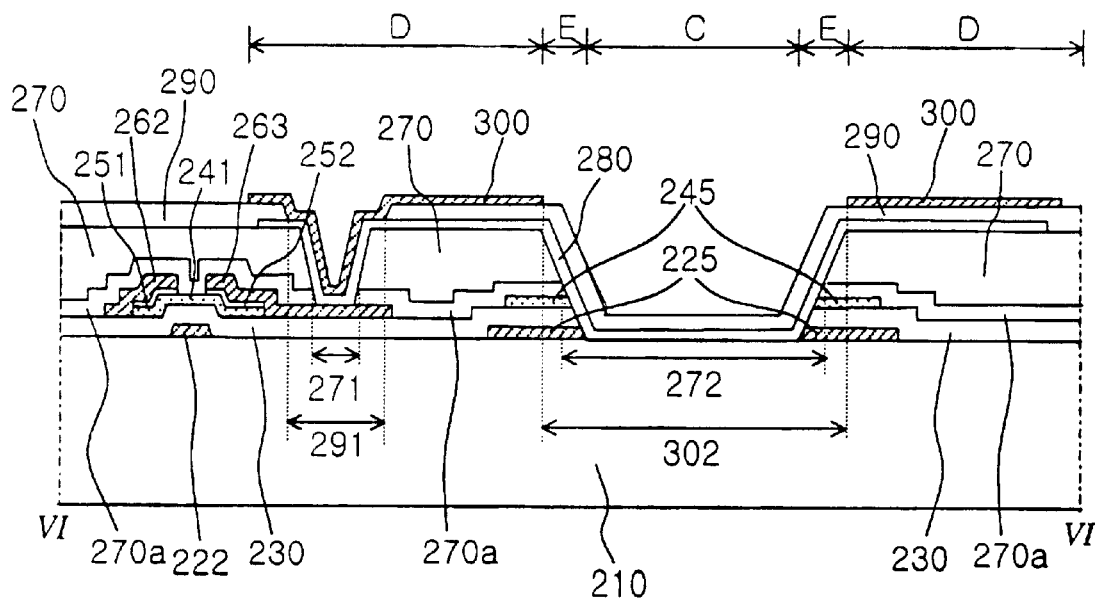

In FIG. 9G, a metallic material having a superior reflectivity, such as aluminum or aluminum alloy, is deposited on the second passivation layer 290, and then patterned to form the reflective electrode 300. Here, the reflective electrode 300 is disposed in the pixel region defined by the gate and data lines 121 and 161 (in FIG. 4), and has the second transmitting hole 302 over the first transmitting hole 272. The reflective electrode 300 contacts the transparent electrode 280 through the second contact hole 291.

In the first and second embodiments, the first passivation layer is formed of an organic material and the second passivation layer is formed of an inorganic material. As a contrary concept, however, the first passivation layer can be formed of the inorganic material and the second passivation layer is formed of the organic material.

Figure 10:
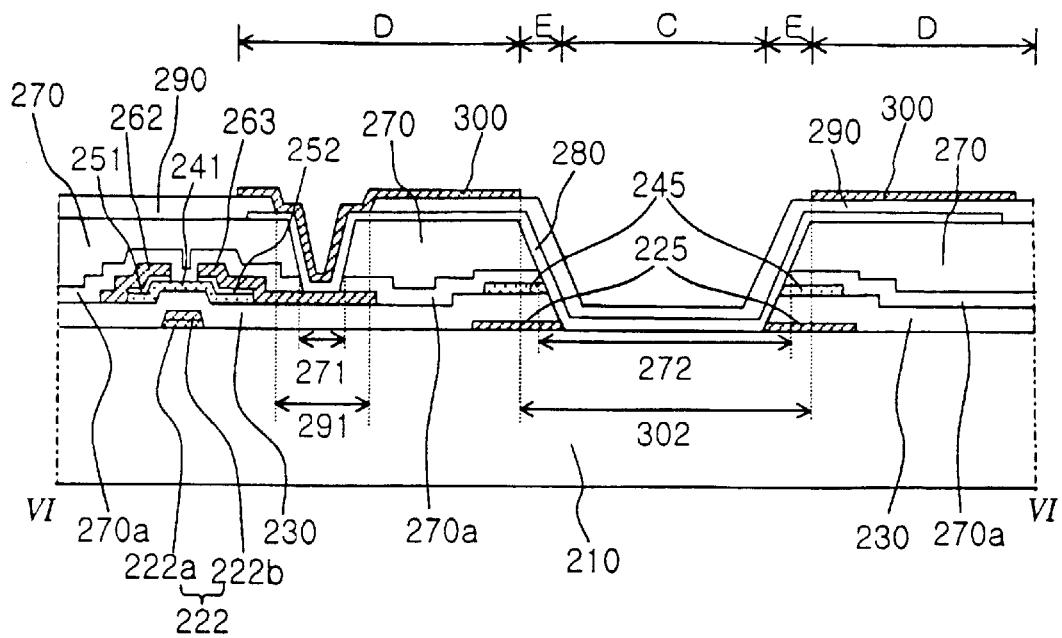
FIG. 10 shows the cross-sectional view of FIG. 8 modified to have a dual layer gate electrode.

As shown in FIG. 10, the structure of the second embodiment as illustrated in FIG. 8 can be modified to include a gate electrode 222 having a double layer structure. For example, a lower gate portion 222a may be aluminum, while an upper gate portion 222b may be molybdenum. In such case, the first light shielding pattern 225 is of the same material as one of the lower gate portion 222a and the upper gate portion 222b.

Figure 11:
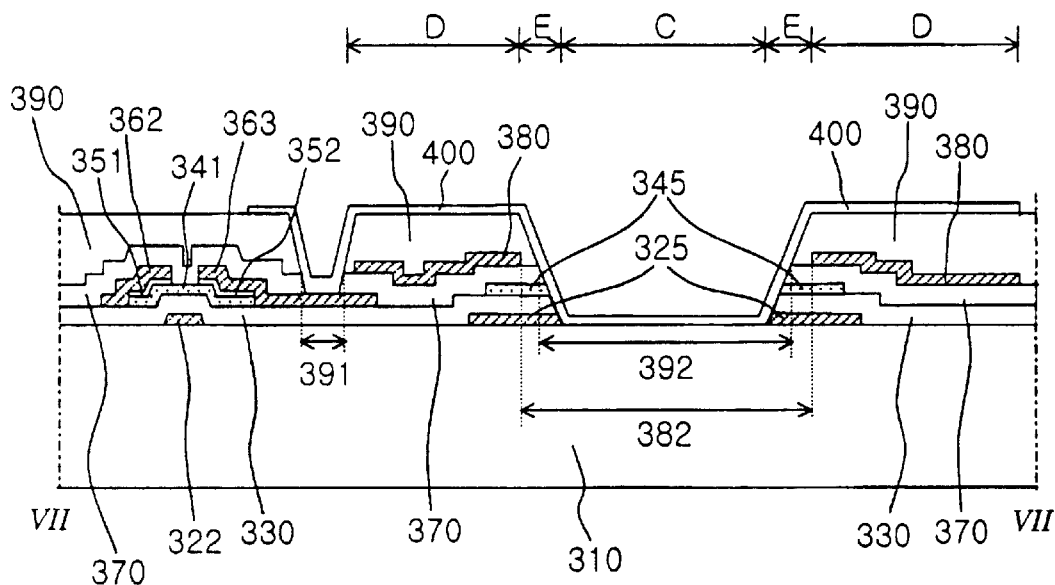
FIG. 11 shows a cross-sectional view according to a third embodiment of the present invention taken along line VII—VII of FIG. 4.

FIG. 11 shows cross-sectional view taken along line VI—VI of FIG. 4 and illustrates an array substrate according to a third embodiment of the present invention. The array substrate shown in FIG. 11 is similar to that shown in FIGS. 5 and 8, but there are some differences.

In FIG. 11, the array substrate of the present invention is also divided into a transmissive portion C, a reflective portion D and a border region E. A gate electrode 322 and a first light-shielding pattern 325 are formed on the transparent substrate 310. The first light-shielding pattern 325 is disposed in the border region E between the transmissive portion C and the reflective portion D, and has an opening corresponding in position to the transmissive portion C. The first light-shielding pattern 325 not only lies in the border region E but also extends' to the reflective portion D. A gate insulation layer 330 is formed on the transparent substrate 310 to cover the gate electrodes 322 and the first light-shielding pattern 325. The first light shielding pattern 325 may be of the same material as the gate electrode 322, gate line (not shown) or data line (not shown).

An active layer 341 is formed on the gate insulation layer 330, especially over the gate electrode 322. A second light-shielding pattern 345 is also formed on the gate insulation layer 330 above the first light-shielding pattern 325. Here, the active layer 341 and the second light-shielding pattern 345 are formed of amorphous silicon. Like the first light-shielding pattern 325, the second light-shielding pattern 345 is also disposed in the border region E between the transmissive portion C and the reflective portion D, and has an opening corresponding in position to the transmissive potion C. The second light-shielding pattern 345 not only lies in the border region E but also extends to the reflective portion D. On the active layer 341 disposed are ohmic contact layers 351 and 352 that are made of impurity-included amorphous silicon. A source electrode 362 is formed on the first ohmic contact layer 351, while a drain electrode 363 is formed on the second ohmic contact layer 352.

A first passivation layer 370 is formed on the gate insulation layer 330 to cover the second light-shielding pattern 345 and the source and drain electrodes 362 and 363. A reflective plate 380 is formed on the first passivation layer 370. The reflective plate 380 corresponds to the reflective portion D, and has a first transmitting hole 382 corresponding to both the reflective portion C and the border region E. The first transmitting hole 382 may be a little bit wider than a second transmitting hole that is formed in a later step. Aluminum or aluminum alloy is employed for the reflective plate 380, for example. The material for the reflective plate 380 should have a superior reflectivity. A second passivation layer 390 is formed on the first passivation layer 370 to cover the reflective plate 380. The second passivation layer 390 is an organic material, such as benzocyclobutene (BCB) or acryl-based resin. As described in the first and second embodiments, since the inorganic passivation layer 370 is interposed between the TFT and the organic passivation layer 390, it prevents the deterioration of the electrical characteristics of the TFT. The first and second passivation layers 370 and 390 have a drain contact hole 391 that exposes a portion of the drain electrode 363 and a second transmitting hole 392 that corresponds to the transmissive portion C. In the structure shown in FIG. 11, the second transmitting hole 392 can penetrate the gate insulation layer 330 to the transparent substrate 310. As described hereinbefore, the second transmitting hole 392 provides different cell gaps between in the transmissive portion C and in the reflective portion D, thereby allowing the transflective LCD device to display uniform brightness whether the transflective LCD device is operating as the transmissive mode or as the reflective mode. Substantially, the cell gap of the transmissive portion C is twice as large as that of the reflective portion D. A transparent electrode 400 is formed on the second passivation layer 390 and contacts the drain electrode 363 through the drain contact hole 391. The transparent electrode 400 is made of a transparent conductive material, such as indium tin oxide (ITO) or indium zinc oxide (IZO). Since such a transparent conductive material does not contaminate the deposition apparatus when it is deposited on the organic passivation layer 390, an additional inorganic insulation layer is not required between the organic passivation layer 390 and the transparent electrode 400.

In the third embodiment, since the first passivation layer 370 are formed of the inorganic material and since the reflective plate 380 are formed on the inorganic material (i.e., the first passivation layer 370), the additional inorganic layer is not required on front and rear surfaces of the organic passivation layer 390. Therefore, when forming the array substrate according to the third embodiment, the manufacturing process steps are reduced.

FIGS. 12A to 12F show cross-sectional views taken along line VII—VII of FIG. 4 and illustrate the sequential process steps of manufacturing an array substrate according to the third embodiment of the present invention.

Figure 12A:
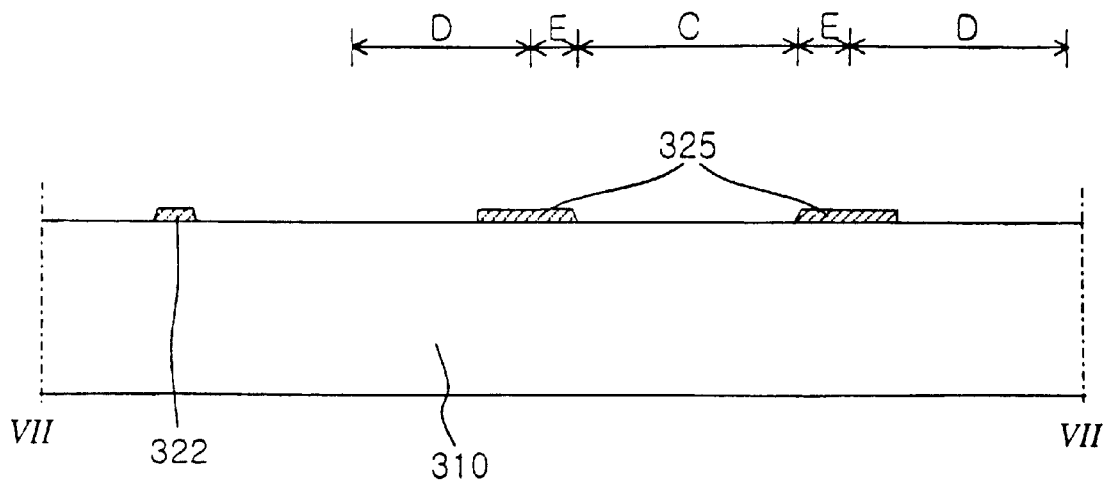
FIGS. 12A to 12F illustrate the process steps of manufacturing an array substrate according to the third embodiment of the present invention.

Referring first to FIG. 12A, a metallic material is deposited on the transparent substrate 310 and then patterned to form the gate electrode 322 and the first light-shielding pattern 325. The first light-sheilding pattern 325 is disposed in a position corresponding to the border region E between the transmissive portion C and the reflective portion D and has an opening corresponding to the transmissive portion C.

Figure 12B:
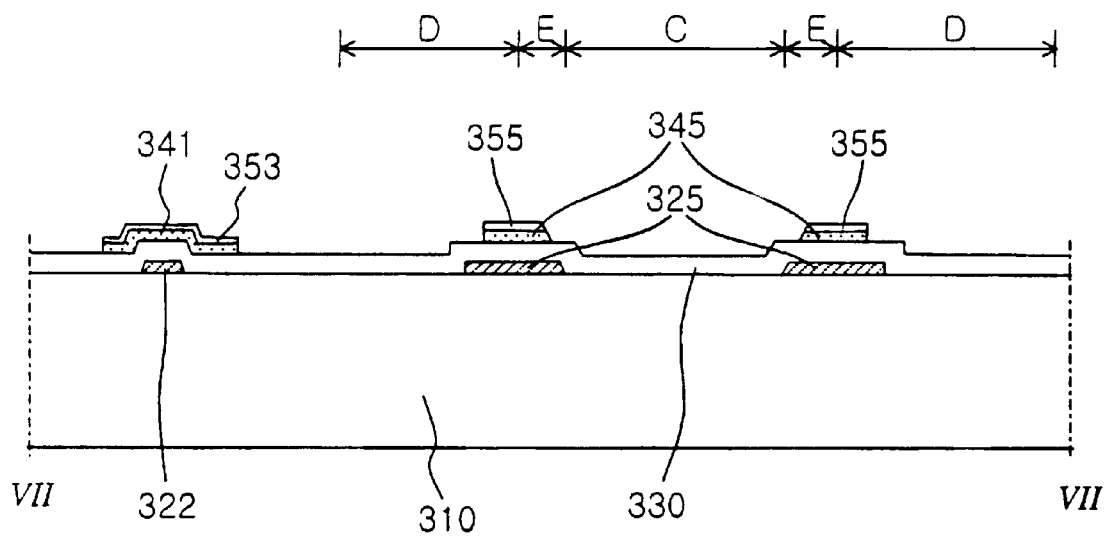

In FIG. 12B, the gate insulation layer 330 is formed on the transparent substrate 310 to cover the gate electrode 322 and the first light-shielding pattern 325. Thereafter, an amorphous silicon layer and an impurity-included amorphous silicon layer are sequentially formed on the gate insulation layer 330, and then patterned to form the active layer 341 over the gate electrode 322 and the extrinsic semiconductor layer 353 on the active layer 341, respectively. At this time, the second light-shielding pattern 345 and a dummy pattern 355 are also sequentially formed on the gate insulation layer 330 and over the first light-shielding pattern 325.

Figure 12C:
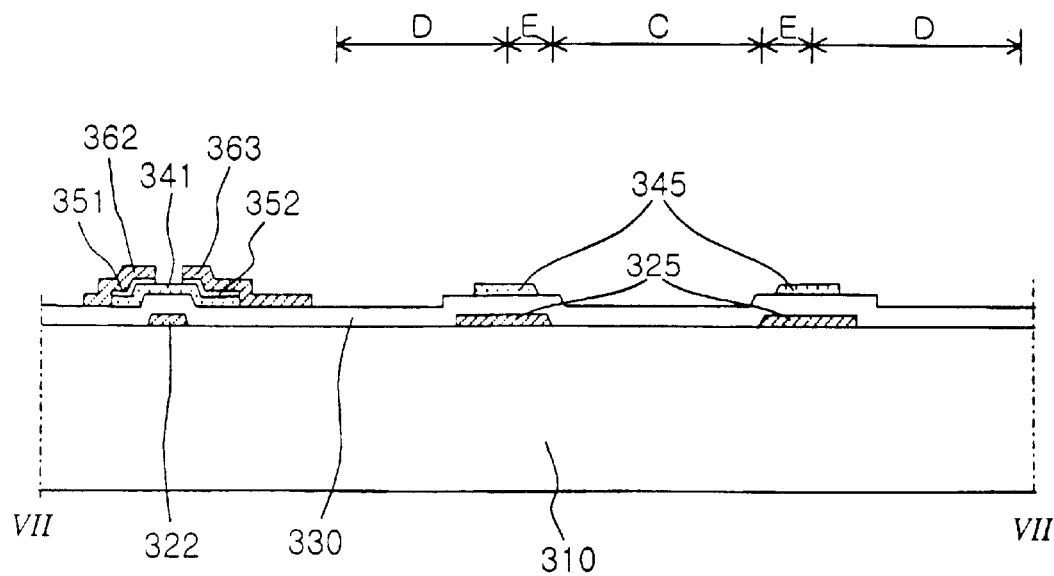

Next in FIG. 12C, a metallic material is deposited on the gate insulation layer 330 to cover the patterned silicon layers, and then patterned to form the source and drain electrodes 362 and 363. Thereafter, the exposed portion of the extrinsic semiconductor layer 353 is eliminated, and the dummy pattern 355 is also simultaneously removed, thereby forming the first and second ohmic contact layers 351 and 352. As a result, the drain electrode 362 is formed on the first ohmic contact layer 351 and the source electrode 363 is formed on the second ohmic contact layer 352.

Figure 12D:
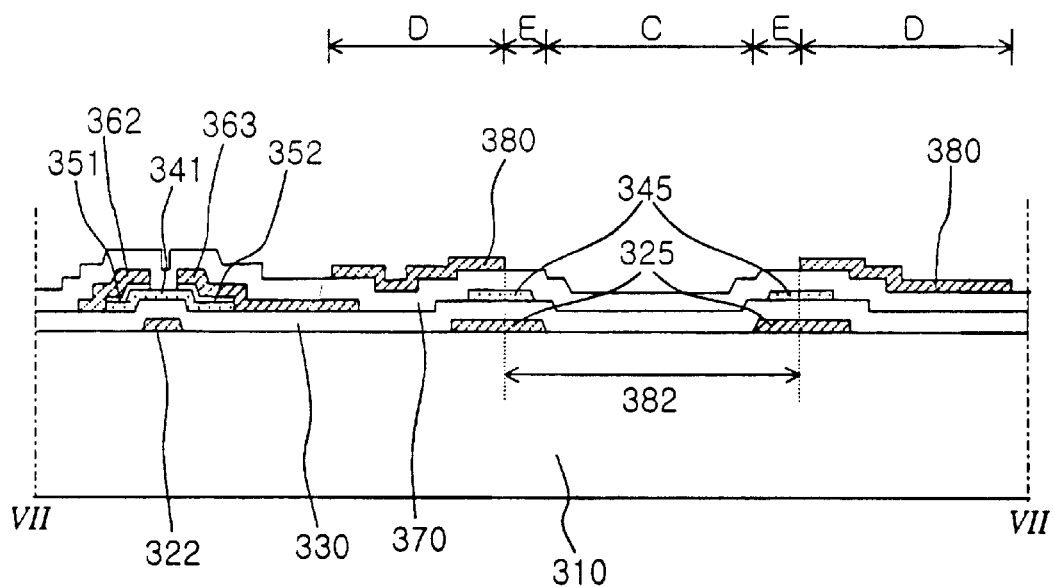

In FIG. 12D, the first passivation layer 370 is deposited on the gate insulation layer 330 using one of silicon nitride and silicon oxide to cover the second light-shielding pattern 345 and the source and drain electrodes 362 and 363. Thereafter, a metallic material having a superior reflectivity, such as aluminum or aluminum alloy, is deposited on the first passivation layer 370, and then patterned to form the reflective plate 380. Here, the reflective plate 380 is disposed in the pixel region defined by the gate and data lines 121 and 161 (in FIG. 4), and has the first transmitting hole 382 that corresponds to both transmissive portion C and the border region E. As a result, the reflective plate 380 corresponds in position to the reflective portion D.

Figure 12E:
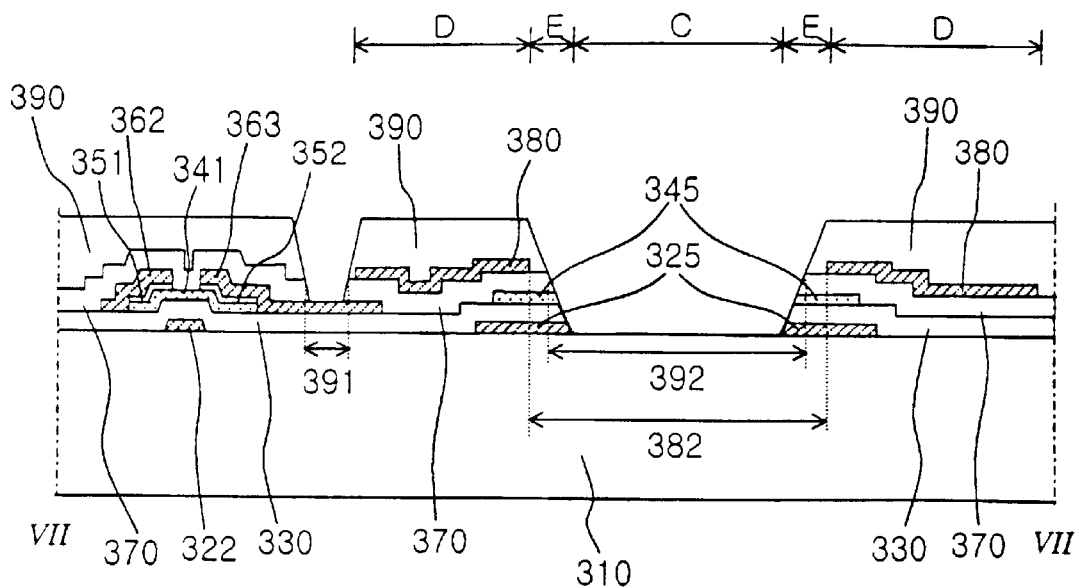

Referring to FIG. 12E, the second passivation layer 390 is formed on the first passivation layer 370 to cover the reflective plate 380. The second passivation layer 390 is one of benzocyclobutene (BCB) and acryl-based resin. Then, the first passivation layer 370 and the second passivation layer 390 are patterned to form the drain contact hole 391 and the second transmitting hole 392. The drain contact hole 391 exposes a portion of the drain electrode 363. The second transmitting hole 392 corresponds to the transmissive portion C. When forming the second transmitting hole 392, a portion of the gate insulation layer 330 can be removed to let the second transmitting hole 392 expose the transparent substrate 310 in the transmissive portion C, as shown in FIG. 12E.

Figure 12F:
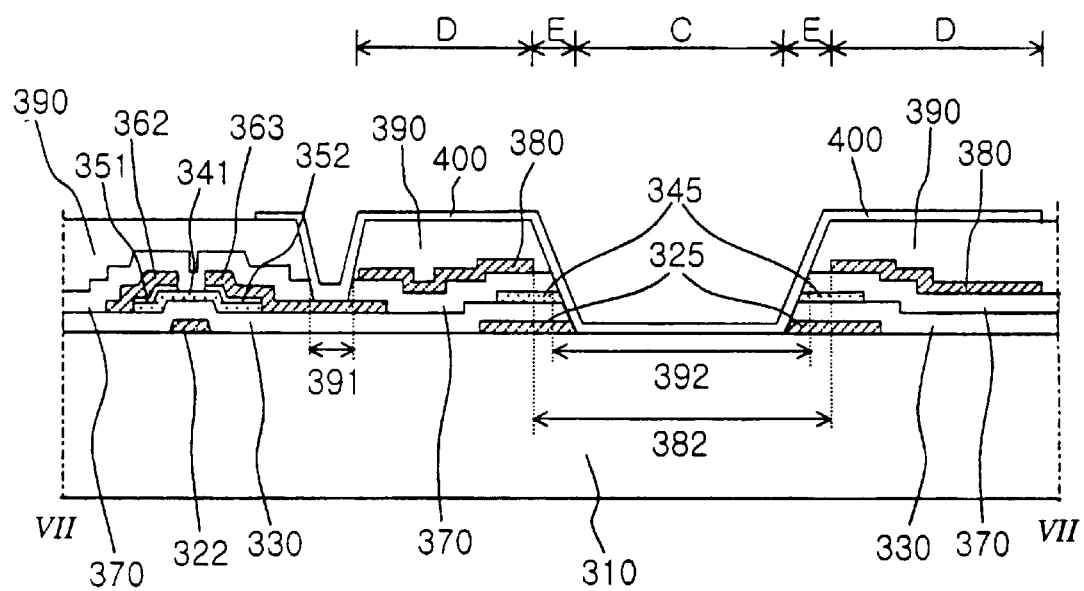

Now in FIG. 12F, a transparent conductive material is deposited on the second passivation layer 390 and then patterned to form the transparent electrode 400. The transparent electrode 400 contacts the drain electrode 363 through the drain contact hole 391. Here, the transparent conductive material is indium tin oxide (ITO) or indium zinc oxide (IZO).

Accordingly in the third embodiment, since the reflective plate is disposed between the inorganic passivation layer and the organic passivation layer, the additional inorganic layer is not needed, thereby decreasing the manufacturing process.

Figure 13:
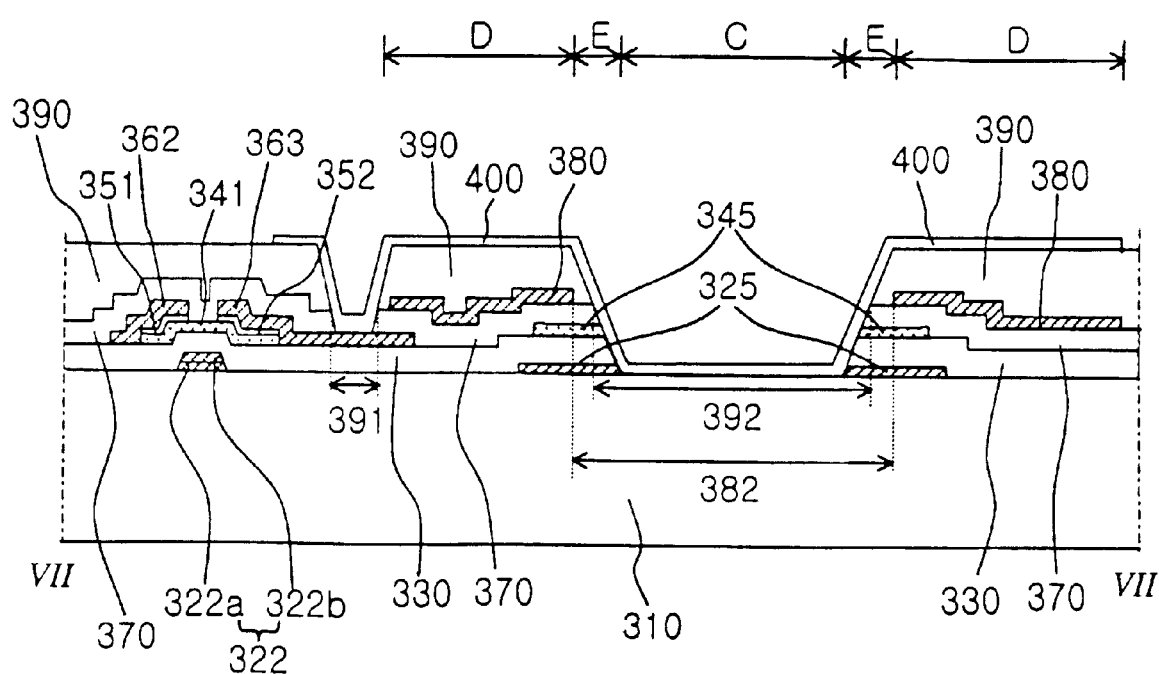
FIG. 13 shows the cross-sectional view of FIG. 11 modified to have a dual layer gate electrode.

As shown in FIG. 13, the structure of the third embodiment as illustrated in FIG. 11 can be modified to include a gate electrode 322 having a double layer structure. For example, a lower gate portion 322a may be aluminum, while an upper gate portion 322b may be molybdenum. In such case, the first light shielding pattern 325 is of the same material as on the lower gate portion 322a and the upper gate portion 322b.

As aforementioned, since the first light-shielding pattern are formed using the same material as the gate lines and electrodes in the border region E between the transmissive portion C and the reflective portion D, the light generated from the backlight device can be prevented when the transflective LCD device is operating in the transmissive mode. Furthermore, since the amorphous silicon of the second light-transmitting pattern absorbs the ambient light from the outside, it can prevent the distortion caused by the reflective light in the transmissive mode and in the reflective mode. From these results, a high contrast ratio can be achieved in the transflective LCD device. Additionally, the manufacturing process steps do not increase according to the present invention although the light-shielding patterns are formed in the array substrate of the transflective LCD device.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An array substrate for a transflective liquid crystal display, comprising:
   a substrate including a transmissive portion, a reflective portion and a border region in a pixel region, wherein the border region is between the transmissive portion and the reflective portion;
   at least a gate line, a gate electrode and a first light-shielding pattern on the substrate, wherein the first light-shielding pattern has a first opening corresponding in position to the transmissive portion and is disposed in the border region;
   a gate insulation layer on the substrate covering the gate line, the gate electrode and the first light-shielding pattern;
   an active layer on the gate insulation layer over the gate electrode;
   a second light-shielding pattern on the gate insulation layer, wherein the second light-shielding pattern has a second opening corresponding in position to the transmissive portion and is disposed in the border region;
   first and second ohmic contact layers on the active layer;
   at least a data line, a source electrode and a drain electrode, wherein the data line defines the pixel region with the gate line, and wherein the source electrode is disposed on the first ohmic contact layer and the drain electrode is disposed on the second ohmic contact layer;
   an inorganic insulation layer on the gate insulation layer, the inorganic insulation layer covering the data line, the source and drain electrodes and the second light-shielding pattern; and
   an organic passivation layer on the inorganic insulation layer;
   wherein the inorganic insulation layer and the organic passivation layer have a drain contact hole that exposes a portion of the drain electrode; and
   wherein the inorganic insulation layer and the organic passivation layer have a first transmitting hole that corresponds in position to the transmissive potion.

2. The array substrate according to claim 1, further comprising:
   a first inorganic passivation layer on the organic passivation layer;
   a reflective plate on the first inorganic passivation layer;
   a second inorganic passivation layer on the first inorganic passivation layer to cover the reflective plate; and
   a transparent electrode on the second inorganic passivation layer.

3. The array substrate according to claim 2, wherein the reflective plate has a second transmitting hole that corresponds in position to both the transmissive portion and the border region.

4. The array substrate according to claim 2, wherein the reflective plate overlaps a portion of the border region.

5. The array substrate according to claim 2, wherein the reflective plate is disposed in the reflective portion.

6. The array substrate according to claim 2, wherein the first and second inorganic passivation layers have an additional drain contact hole that exposes a portion of the drain electrode.

7. The array substrate according to claim 6, wherein the transparent electrode contacts the drain electrode through the additional drain contact hole.

8. The array substrate according to claim 2, wherein the first and second inorganic passivation layers are formed of an inorganic material selected from a group consisting of silicon nitride and silicon oxide.

9. The array substrate according to claim 2, wherein the reflective plate is made of a metallic material selected from a group consisting of aluminum and aluminum alloy.

10. The array substrate according to claim 2, wherein the transparent electrode is formed of a transparent conductive material.

11. The array substrate according to claim 10, wherein the transparent conductive material is one of indium tin oxide and indium zinc oxide.

12. The array substrate according to claim 1, wherein the organic passivation layer is formed of an organic material selected from a group consisting of benzocyclobutene and acryl-based resin.

13. The array substrate according to claim 1, wherein the first and second light-shielding patterns extend to the reflective portion.

14. The array substrate according to claim 1, wherein the first transmitting hole exposes the substrate by removing a portion of the gate electrode in the first opening.

15. The array substrate according to claim 1, wherein the first light shielding pattern is made of the same material as the gate line.

16. The array substrate of claim 1, wherein the gate line has a two layer structure and wherein the first light shielding pattern is made of the same material as at least one of the two layers of the gate line.

17. The array substrate of claim 1, wherein the second light shielding pattern is made of amorphous silicon.

18. The array substrate according to claim 1, further comprising:
    a transparent electrode on the organic passivation layer, the transparent electrode contacting the drain electrode through the drain contact hole;
    an inorganic passivation layer on the organic passivation layer to cover the transparent electrode, the inorganic passivation layer having a contact hole that exposes a portion of the transparent electrode over the drain contact hole; and
    a reflective electrode on the inorganic passivation layer, the reflective electrode contacting the transparent electrode through the contact hole, the reflective electrode having a second transmitting hole that corresponds to both the transmissive portion and the border region.

19. The array substrate according to claim 18, wherein the reflective electrode is disposed in the reflective portion.

20. The array substrate according to claim 18, wherein the inorganic passivation layers is formed of an inorganic material.

21. The array substrate of claim 20, wherein the inorganic material is one of silicon nitride and silicon oxide.

22. The array substrate according to claim 18, wherein the reflective electrode is made of one of aluminum and aluminum alloy.

23. The array substrate according to claim 18, wherein the transparent electrode is formed of a transparent conductive material selected from a group consisting of indium tin oxide and indium zinc oxide.

24. The array substrate according to claim 1, further comprising:
    a reflective plate between the inorganic insulation layer and the organic passivation layer, the reflective plate having a second transmitting hole corresponding to both the transmissive portion and the border region; and
    a transparent electrode on the organic passivation layer, the transparent electrode contacting the drain electrode through the drain contact hole.

25. The array substrate according to claim 24, wherein the reflective plate is made of one of aluminum and aluminum alloy.

26. The array substrate according to claim 24, wherein the transparent electrode is formed of a transparent conductive material selected from a group consisting of indium tin oxide and indium zinc oxide.

27. A method of manufacturing an array substrate for use in a transflective liquid crystal display, comprising the steps of:
    providing a substrate that includes a transmissive portion, a reflective portion and a border region in a pixel region, wherein the border region is between the transmissive portion and the reflective portion;
    simultaneously forming at least a gate line, a gate electrode and a first light-shielding pattern on the substrate, wherein the first light-shielding pattern has a first opening corresponding in position to the transmissive portion and is disposed in the border region;
    forming a gate insulation layer on the substrate to cover the gate line, the gate electrode and the first light-shielding pattern;
    simultaneously forming an active layer and a second light-shielding pattern, wherein the active layer is disposed on the gate insulation layer over the gate electrode and the second light-shielding pattern is disposed on the gate insulation layer, and wherein the second light-shielding pattern has a second opening corresponding in position to the transmissive portion and is disposed in the border region;
    forming first and second ohmic contact layers on the active layer;
    simultaneously forming at least a data line, a source electrode and a drain electrode, wherein the data line defines the pixel region with the gate line, and wherein the source electrode is disposed on the first ohmic contact layer and the drain electrode is disposed on the second ohmic contact layer;
    forming an inorganic insulation layer on the gate insulation layer to cover the data line, the source and drain electrodes and the second light-shielding pattern; and
    forming an organic passivation layer on the inorganic insulation layer; and
    patterning both the inorganic insulation layer and the organic passivation layer to from a drain contact hole and a first transmitting hole, wherein the drain contact hole exposes a portion of the drain electrode, and wherein the transmitting hole corresponds in position to the transmissive portion.

28. The method according to claim 27, further comprising the steps of:
    forming a first inorganic passivation layer on the organic passivation layer;
    forming a reflective plate on the first inorganic passivation layer;

forming a second inorganic passivation layer on the first inorganic passivation layer to cover the reflective plate; and forming a transparent electrode on the second inorganic passivation layer.

29. The method according to claim 28, wherein the reflective plate has a second transmitting hole that corresponds in position to both the transmissive portion and the border region.

30. The method according to claim 28, wherein the reflective plate is disposed in the reflective portion.

31. The method according to claim 28, further comprising the step of patterning both the first and second inorganic passivation layers to form an additional drain contact hole that exposes a portion of the drain electrode.

32. The method according to claim 31, wherein the transparent electrode contacts the drain electrode through the additional drain contact hole.

33. The method according to claim 28, wherein the first and second inorganic passivation layers are formed of an inorganic material selected from a group consisting of silicon nitride and silicon oxide.

34. The method according to claim 28, wherein the reflective plate is made of one of aluminum and aluminum alloy.

35. The method according to claim 28, wherein the transparent electrode is formed of a transparent conductive material.

36. The method according to claim 35, wherein the transparent conductive material is one of indium tin oxide and indium zinc oxide.

37. The method according to claim 28, wherein the organic passivation layer is formed of an organic material selected from a group consisting of benzocyclobutene and acryl-based resin.

38. The method according to claim 28, wherein the first and second light-shielding patterns extend to the reflective portion.

39. The method according to claim 28, further comprising a step of removing a portion of the gate electrode located in the first opening to expose the substrate.

40. The method according to claim 27, further comprising the steps of:

forming a transparent electrode on the organic passivation layer, the transparent electrode contacting the drain electrode through the drain contact hole;

forming an inorganic passivation layer on the organic passivation layer to cover the transparent electrode, the inorganic passivation layer having a contact hole that exposes a portion of the transparent electrode over the drain contact hole; and forming a reflective electrode on the inorganic passivation layer, the reflective electrode contacting the transparent electrode through the contact hole, the reflective electrode having a second transmitting hole that corresponds to both the transmissive portion and the border region.

41. The method according to claim 40, wherein the reflective electrode is disposed in the reflective portion.

42. The method according to claim 40, wherein the inorganic passivation layer is formed of an inorganic material selected from a group consisting of silicon nitride and silicon oxide.

43. The method according to claim 40, wherein the reflective electrode is made of one of aluminum and aluminum alloy.

44. The method according to claim 40, wherein the transparent electrode is formed of a transparent conductive material.

45. The method according to claim 44, wherien the transparent conductive material is one of indium tin oxide and indium zinc oxide.

46. The method according to claim 27, further comprising the steps of:

forming a reflective plate between the inorganic insulation layer and the organic passivation layer, the reflective plate having a second transmitting hole corresponding to both the transmissive portion and the border region; and forming a transparent electrode on the organic passivation layer, the transparent electrode contacting the drain electrode through the drain contact hole.

47. The method according to claim 46, wherein the reflective plate is made of one of aluminum and aluminum alloy.

48. The method according to claim 46, wherein the transparent electrode is formed of a transparent conductive material selected from a group consisting of indium tin oxide and indium zinc oxide.

* * * * *